(12) United States Patent
Moon

(10) Patent No.: US 12,126,728 B2
(45) Date of Patent: Oct. 22, 2024

(54) ANTI-REPLAY PROTECTION BASED ON HASHING ENCRYPTED TEMPORAL KEY IN A SECURE PEER-TO-PEER DATA NETWORK

(71) Applicant: WhiteStar Communications, Inc., Durham, NC (US)

(72) Inventor: Billy Gayle Moon, Apex, NC (US)

(73) Assignee: WhiteStar Communications, Inc., Durham, NC (US)

( * ) Notice: Subject to any disclaimer, the term of this patent is extended or adjusted under 35 U.S.C. 154(b) by 619 days.

(21) Appl. No.: 17/348,667

(22) Filed: Jun. 15, 2021

(65) Prior Publication Data

US 2022/0400011 A1    Dec. 15, 2022

(51) Int. Cl.
*H04L 9/32* (2006.01)
*H04L 9/08* (2006.01)
*H04L 9/40* (2022.01)

(52) U.S. Cl.
CPC .......... *H04L 9/3236* (2013.01); *H04L 9/0819* (2013.01); *H04L 9/3247* (2013.01); *H04L 63/0428* (2013.01)

(58) Field of Classification Search
CPC .... H04L 9/3236; H04L 9/0819; H04L 9/3247
USPC ....................................................... 713/171
See application file for complete search history.

(56) References Cited

U.S. PATENT DOCUMENTS

| | | | |
|---|---|---|---|
| 7,234,063 B1 * | 6/2007 | Baugher | H04L 9/0891 713/153 |
| 7,792,989 B2 | 9/2010 | Toebes et al. | |
| 7,818,607 B2 | 10/2010 | Turner et al. | |
| 8,549,014 B2 * | 10/2013 | Acharya | G06Q 30/0246 707/751 |
| 9,071,416 B2 * | 6/2015 | Liu | H04W 12/03 |
| 11,770,711 B2 * | 9/2023 | Klinkner | G06F 16/9537 713/171 |
| 2012/0195429 A1 * | 8/2012 | Balissat | H04L 63/0209 380/255 |

(Continued)

OTHER PUBLICATIONS

"4-Way Handshake", Jan. 24, 2019, [online], [retrieved on Jun. 1, 2021]. Retrieved from the Internet: URL: <https://www.wifi-professionals.com/2019/01/4-way-handshake>, pp. 1-21.

(Continued)

*Primary Examiner* — Dant B Shaifer Harriman
(74) *Attorney, Agent, or Firm* — Leon R. Turkevich

(57) ABSTRACT

In one embodiment, a method comprises: generating and maintaining, by a network device in a secure peer-to-peer data network, a secure private key and a corresponding secure public key; establishing, by the network device, a two-way trusted relationship with a second network device in the secure peer-to-peer data network; generating by the network device a temporal key, and encrypting a data packet payload using the temporal key into an encrypted payload; encrypting, by the network device, the temporal key into an encrypted temporal key using a second secure public key of the second network device; and generating and outputting a secure data packet comprising the encrypted temporal key and the encrypted payload, enabling a receiving network device to verify the secure data packet is not a copy based on a determined absence of a prior prescribed hash of at least a portion of the encrypted temporal key.

20 Claims, 15 Drawing Sheets

(56) References Cited

U.S. PATENT DOCUMENTS

| | | | | |
|---|---|---|---|---|
| 2015/0319151 | A1* | 11/2015 | Chastain | H04L 9/083 713/171 |
| 2019/0020633 | A1* | 1/2019 | Leavy | H04L 9/14 |
| 2019/0141017 | A1* | 5/2019 | Carrel | H04L 67/104 |
| 2019/0327245 | A1* | 10/2019 | Holton | H04L 63/0853 |
| 2020/0274699 | A1* | 8/2020 | Watson | H04L 9/14 |
| 2021/0026535 | A1 | 1/2021 | Moon | |
| 2021/0026976 | A1 | 1/2021 | Moon | |
| 2021/0028940 | A1 | 1/2021 | Moon | |
| 2021/0028943 | A1 | 1/2021 | Moon | |
| 2021/0029092 | A1 | 1/2021 | Moon | |
| 2021/0029125 | A1 | 1/2021 | Moon | |
| 2021/0029126 | A1 | 1/2021 | Moon | |
| 2021/0081524 | A1 | 3/2021 | Moon | |
| 2022/0171555 | A1* | 6/2022 | Ponnuswamy | H04L 67/1097 |
| 2023/0033192 | A1 | 2/2023 | Sutherland et al. | |

OTHER PUBLICATIONS

Thubert, Ed., et al., "Address Protected Neighbor Discovery for Low-Power and Lossy Networks", [online], 6lo Internet Draft, Feb. 23, 2018, [retrieved on Oct. 30, 2018]. Retrieved from the Internet: URL: <https://tools.ietf.org/pdf/draft-ietf-6lo-ap-nd-06.pdf>, pp. 1-22.
Lehembre, "Wi-Fi-security—WEP, WPA and WPA2", Jun. 2005, [online], [retrieved on Jun. 1, 2021]. Retrieved from the Internet: URL: <http://tele1.dee.fct.unl.pt/rit2_2015_2016/files/hakin9_wifi_EN.pdf>, 14 pages.
Leach et al., "A Universally Unique IDentifier (UUID) URN Namespace", Network Working Group, Request for Comments: 4122, Jul. 2005, [online], [retrieved on May 20, 2021]. Retrieved from the Internet: URL: <https://www.rfc-editor.org/rfc/pdfrfc/rfc4122.txt.pdf>, pp. 1-32.
Winter, Ed., et al., "RPL: IPv6 Routing Protocol for Low-Power and Lossy Networks", Internet Engineering Task Force (IETF), Request for Comments: 6550, Mar. 2012, pp. 1-157.
Thubert, Ed., et al., "Registration Extensions for IPv6 over Low-Power Wireless Personal Area Network (6LoWPAN) Neighbor Discovery", Internet Engineering Task Force (IETF), Request for Comments: 8505, Nov. 2018, [online], [retrieved on Nov. 16, 2018]. Retrieved from the Internet: <https://tools.ietf.org/pdf/rfc8505.pdf>, pp. 1-47.
Wikipedia, "Cryptographic nonce", May 4, 2021, [online], [retrieved on Jun. 8, 2021]. Retrieved from the Internet: URL: <https://en.wikipedia.org/wiki/Cryptographic_nonce>, 3 pages.
Wikipedia, "Replay attack", Jun. 4, 2021, [online], [retrieved on Jun. 8, 2021]. Retrieved from the Internet: URL: <https://en.wikipedia.org/wiki/Replay_attack>, 5 pages.
Zhang et al., "IPsec Anti-Replay Algorithm without Bit Shifting", Independent Submission, Request for Comments: 6479, Jan. 2012, [online], [retrieved on Jun. 8, 2021]. Retrieved from the Internet: URL: <https://www.rfc-editor.org/rfc/pdfrfc/rfc6479.txt.pdf>, pp. 1-9.
Society video, "SOCIETY Secure Messenger: The world's most secure way to chat", Text and Screenshots, (Mar. 10, 2020), [online], [Retrieved on Mar. 3, 2022]. Retrieved from the Internet: URL: <https://www.youtube.com/watch?v=jSRmnseSCVA>, 9 pages.
Society video, "Complete AI Security", Text, Transcript, and Screenshots, (Mar. 19, 2020), [online], [Retrieved on Mar. 3, 2022]. Retrieved from the Internet: URL: <https://www.youtube.com/watch?v=5U2khXXcDMo>, 16 pages.
Society video, "Society's Best in Class Security and the Cohort System", Text, Transcript, and Screenshots, (Mar. 26, 2020), [online], [Retrieved on Mar. 3, 2022]. Retrieved from the Internet: URL: <https://www.youtube.com/watch?v=dwUlktWMMoc>, 11 pages.
Society video, "SOCIETY Tutorial 6 : Advanced Controls", Transcript and Screenshots, (Apr. 6, 2020), [online], [Retrieved on Mar. 3, 2022]. Retrieved from the Internet: URL: <https://www.youtube.com/watch?v=5jIVTcQmADw>, 5 pages.
Society video, "SOCIETY Tutorial 5: Conversation Controls", Transcript and Screenshots, (Apr. 6, 2020), [online], [Retrieved on Mar. 4, 2022]. Retrieved from the Internet: URL: <https://www.youtube.com/watch?v=v6uDbsFPqhc>, 11 pages.
Society video, "Creating a Conversation", Transcript and Screenshots, (Apr. 6, 2020), [online], [Retrieved on Mar. 4, 2022]. Retrieved from the Internet: URL: <https://www.youtube.com/watch?v=irvX9ZyaPLM>, 4 pages.
Society video, "SOCIETY Tutorial Part 7 : Notifications and Misc", Transcript and Screenshots, (Apr. 6, 2020), [online], [Retrieved on Mar. 4, 2022]. Retrieved from the Internet: URL: <https://www.youtube.com/watch?v=muxTsR1PvZA>, 7 pages.
Callas et al., "OpenPGP Message Format", Network Working Group, Request for Comments: 4880, Nov. 2007, [online], [retrieved on Oct. 28, 2021]. Retrieved from the Internet: URL: <https://www.rfc-editor.org/rfc/pdfrfc/rfc4880.txt.pdf>, pp. 1-90.
Society video, "Society Tutorial 1: Setting Up and Making a Connection", Transcript and Screenshots, (Jun. 29, 2020), [online], [Retrieved on Mar. 4, 2022]. Retrieved from the Internet: URL: <https://www.youtube.com/watch?v=4k8cYbv-Of0>, 15 pages.

* cited by examiner

ANTI-REPLAY PROTECTION BASED ON HASHING ENCRYPTED TEMPORAL KEY IN A SECURE PEER-TO-PEER DATA NETWORK

STATEMENT REGARDING PRIOR DISCLOSURES BY THE INVENTOR OR A JOINT INVENTOR

The following U.S. Patent Publications do not qualify as prior art under 35 USC 102(b)(1)(A) because their Jan. 28, 2021 publications are (1) one year or less before the effective filing date of the claimed invention, and (2) by the inventor or a joint inventor: U.S. Pub. 2021/0026535; U.S. Pub. 2021/0026976; U.S. Pub. 2021/0028940; U.S. Pub. 2021/0028943; U.S. Pub. 2021/0029092; U.S. Pub. 2021/0029125; and U.S. Pub. 2021/0029126, the disclosures all of which are incorporated herein by reference to the extent not inconsistent with this application.

TECHNICAL FIELD

The present disclosure generally relates to anti-replay protection based on hashing an encrypted temporal key in a secure peer-to-peer data network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

The Internet Protocol (IP) has enabled the Internet to evolve from a set of connected research institutions and universities to a world wide web of connected IP devices that enables worldwide communications between user-controlled devices ("user devices"), Internet of Things (IoT) devices (devices that do not require user control), and server devices providing ever-increasing cloud-basedd services such as social networking services, business transaction services, media distribution services, data storage services, etc. The enormous success of the Internet is based on the deployment of IP routing protocols that enable a "source" device (having a corresponding "source IP address") that is connected to the Internet to reach a "destination" device (having a corresponding "destination IP address") that also is connected to the Internet.

This universal reachability also has introduced severe security threats to each and every IP device that is connected to the Internet, because any "threat device" originating at a "source" IP address (e.g., a malfunctioning network device infected by malware or a network device operated by a malicious user) can threaten any "target device" at a "destination" IP address in an attempt to steal private data, disrupt the target device, etc. Hence, this universal reachability has resulted in losses on the order of billions (or even trillions) of dollars in losses due to attacks on targeted devices, including attacks on personal devices, as well as attacks on large-scale corporate, government, and/or military networks. Individuals and institutions collectively have expended billions of dollars in network security in an attempt to thwart or mitigate against online attacks, yet malicious users still have been able to overcome network security attempts.

An example security threat is a "replay attack" that is based on one or more threat devices (also referred to as "rogue" devices) sending numerous duplicate packets to one or more target devices in the data network: the duplicate packets can overwhelm the resources of the target device(s), resulting in a Denial of Service (DoS). Existing approaches to preventing a replay attack have been ineffective for various reasons, including requiring substantial processing resources, requiring synchronization between network devices, including additional information in each packet thereby reducing effective bandwidth, etc.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
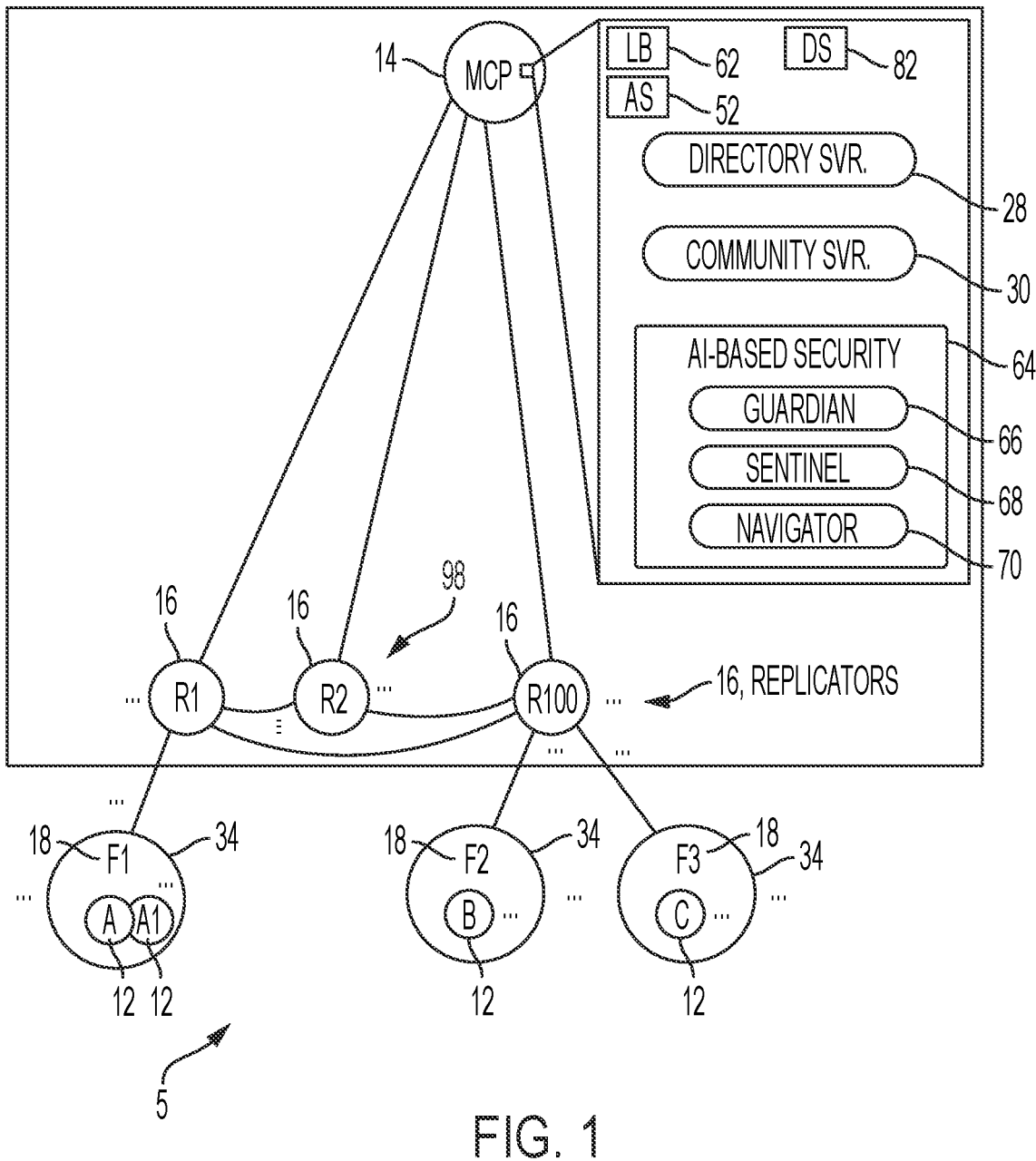
FIG. 1 illustrates a secure peer-to-peer data network comprising an apparatus for registering endpoint devices of requesting users based on establishment of two-way trusted relationships, and providing crypto-signed switching and packet verification based on comparing hashes of encrypted temporal keys, according to an example embodiment.

In one embodiment, a method comprises: generating and maintaining, by a network device in a secure peer-to-peer data network, a secure private key and a corresponding secure public key; establishing, by the network device, a two-way trusted relationship with a second network device in the secure peer-to-peer data network; generating by the network device a temporal key, and encrypting a data packet payload using the temporal key into an encrypted payload; encrypting, by the network device, the temporal key into an encrypted temporal key using a second secure public key of the second network device; and generating and outputting, by the network device, a secure data packet comprising the encrypted temporal key and the encrypted payload, enabling a receiving network device to verify the secure data packet is not a copy based on a determined absence of a prior prescribed hash of at least a portion of the encrypted temporal key.

In another embodiment, a method comprises: receiving, by a network device from a second network device in a data network, a secure data packet comprising a source address, a destination address, a first encrypted bitstring corresponding to an encrypted temporal key, and a second encrypted bitstring corresponding to an encrypted payload in the secure data packet; and validating, by the network device, the secure data packet based on executing a prescribed hash of at least a portion of the first encrypted bitstring, and determining the secure data packet is not a copy based on a determined absence of a prior instance of the prescribed hash.

Detailed Description

Particular embodiments enable anti-replay verification of secure data packets based on comparing prescribed hashes of encrypted temporal keys within the secure data packets. The anti-replay verification based on comparing prescribed hashes of encrypted temporal keys can be implemented as part of a crypto-signed switching between network devices having a secure establishment of universally-unique identities in a secure peer-to-peer data network, the secure peer-to-peer data network established based on an aggregation of two-way trusted relationships.

The secure establishment of universally-unique identities is based on establishing a unique federation identifier for a "requesting party" (e.g., user, business entity, etc.) once a two-way trusted relationship has been established between the requesting party and the secure peer-to-peer data network, and establishing a permanent and unique endpoint identifier for a network device used by the requesting party for joining the secure peer-to-peer data network. The endpoint identifier is associated with the federation identifier to establish that the requesting party has ownership of the corresponding network device, where the "ownership" establishes a two-way trusted relationship between the requesting party and the corresponding network device based on the requesting party retaining possession and control of the network device; hence, the endpoint identifier (associated with the federation identifier) can uniquely identify the network device in the secure peer-to-peer data network as an "endpoint device" that is associated with the requesting party based on a two-way trusted relationship between the requesting party and the endpoint device.

The requesting party can add additional network devices as distinct endpoint devices that are associated with the federation identifier based on a corresponding two-way trusted relationship between the requesting party and the corresponding network device. Hence, a requesting user can aggregate a "federation" of trusted endpoint devices for use within the secure peer-to-peer data network, enabling an autonomic "federating" of trusted network services between the endpoint devices in the same "federation" based on allocation of the same federation identifier.

Moreover, each endpoint device can uniquely and securely identify itself based on cryptographically generating a secure private key and a corresponding secure public key associated with the requesting party utilizing the endpoint device. Hence, data storage in each and every network device in the secure peer-to-peer data network, as well as all network communications between each and every network device, can be secured based on sharing secure public keys between endpoint devices having established a two-way trusted relationship based on a secure verification of membership within the same "federation" according to a prescribed secure salutation protocol.

The secure storage and transmission of data structures can be extended between different "federations" of endpoint devices (established by different users having established respective two-way trusted relationships with the secure peer-to-peer data network), based on the different users establishing their own two-way trusted relationship according to the prescribed secure salutation protocol.

Hence, the example embodiments enable crypto-signed switching between two-way trusted network devices in a secure peer-to-peer data network, based on establishment of two-way trusted relationships between replicator devices for establishment of a trusted pairwise topology of two-way replicator devices; each endpoint device can establish a corresponding two-way trusted relationship with one of the replicator devices in the secure peer-to-peer data network, enabling a source endpoint device to encrypt, cryptographically sign, and send a secure data packet to a destination endpoint device via its trusted replicator device. The replicator device can verify the secure data packet sourced by the trusted endpoint device without any decryption of the secure data packet (including verifying no replay attack), securely identify a trusted peer replicator device for reaching the destination endpoint device, and generate and send to the trusted peer replicator device a secure forwarded packet that is signed by the replicator device and containing the secure data packet.

The trusted peer replicator device can verify the secure forwarded packet signed by the trusted replicator device (including verifying no replay attack) without any decryption of the secure data packet, and forward the secure data packet to the destination endpoint device.

The destination endpoint device can verify the secure data packet sourced by the trusted source endpoint device (including verifying no replay attack), verify the signature in the secure data packet, and decrypt the secure data packet.

Hence, the example embodiments enable secure transmission of data flows between two trusted endpoint devices via trusted replicator devices, where only the destination endpoint device can decrypt the payload that is unreadable by the replicator devices.

Moreover, the example embodiments enable validating that a secure data packet is not a copy of a previously-transmitted secure data packet (e.g., a replay attack) based on executing a prescribed hash of at least a portion of an encrypted temporal key, and determining whether the secure data packet is not a copy based on a determined absence of a prior instance of the prescribed hash. The validation that the secure data packet is not a copy can be implemented by each network device on a per-packet basis with minimal processing requirements, especially since a received secure data packet can be discarded simply based on executing the prescribed hash, and determining the prescribed hash matches a prior instance of the prescribed hash on a previously-received data packet.

A description will first be provided of the secure peer-to-peer data network and the secure identity management system, followed by a description of crypto-signed switching and anti-replay verification between two-way trusted network devices in a secure peer-to-peer data network.

Secure Private Core Network Overview

FIG. 1 illustrates a secure data network 5 comprising an example secure private core network 10, according to an example embodiment. The secure private core network 10 is: a (1) cloudless (2) hybrid peer-to-peer overlay network that (3) can utilize artificial intelligence (AI) to extend security features and operations beyond end-to-end encryption between two endpoint devices 12, for example wireless smartphone devices, wireless smart tablet devices, wireless Internet of Things (IoT) devices, etc. The secure private core network 10 comprises a master control program (MCP) device 14, and one or more replicator devices (e.g., "R1") 16. Each replicator device 16 can be connected to every other replicator device 16, forming a pairwise topology (e.g., a "mesh") 98 of interconnected replicator devices 16; each replicator device 16 also is connected to the MCP device 14; hence, each replicator device 16 provides a connection to zero or more endpoint devices 12 for reaching the MCP device 14 and/or another endpoint device 12, described in further detail below. The devices 12 also can have peer to peer connections to one another allowing direct communications without the aid of the core network 10 (hence the name hybrid peer to peer network). Devices 12 can simultaneously communicate either exclusively with each other, peer to peer, with some devices peer to peer and other devices via the core network 10 or with all other devices 12 via the core network 10.

The peer-to-peer network in the secure private core network 10 is based on a trusted aggregation of strict two-way trusted relationships ("cohorts") between two entities: an "entity" can be based on a physical device (e.g., an endpoint device 12 or a physical network device in the secure private core network 10 such as the MCP device 14) having a verified secure relationship with at least an individual person utilizing the physical device; the verified secure relationship also can be with an identified organization associated with the physical device (e.g., a prescribed manufacturer of an endpoint device 12 such as an IoT device, a service provider offering services based on purchase or rental of an endpoint device 12, etc.); the verified secure relationship also can be with another physical device attempting a communication with the physical device (e.g., a physical device executing the MCP device 14 and/or the replicator device 16, another endpoint device 12, etc.). Hence, the secure private core network 10 requires establishment of a strict two-way trusted relationship between two physical devices (also referred to as a "cohort"), where each physical device either is operated by a user, or is a physical device associated with an identified organization (including a corresponding physical device executing the MCP device 14).

Since an individual person (or identified organization) may utilize one or more endpoint devices 12 for network communications, the secure private core network 10 can identify an individual person (or identified organization) based on the allocation of a "federation" identifier (illustrated as "F1") 18 that has a verified secure relationship with one or more physical network devices (e.g., "A" 12, "A1" 12, etc.) that are utilized by the individual person (or identified organization) for communications within the secure data network 5; hence, the secure data network 5 also is referred to herein as a "secure peer-to-peer data network" based on the trusted aggregation of two-way trusted relationships. As described below, the federation ID 18 is generated by an endpoint device 12 during initial registration of a user (e.g., individual person or identified organization) using a secure random number generator that results in a universally unique identifier (UUID) of at least one-hundred twenty eight (128) bits: an example 128-bit UUID can be implemented as proposed by the Internet Engineering Task Force (IETF) (see RFC 4122).

Figure 2:
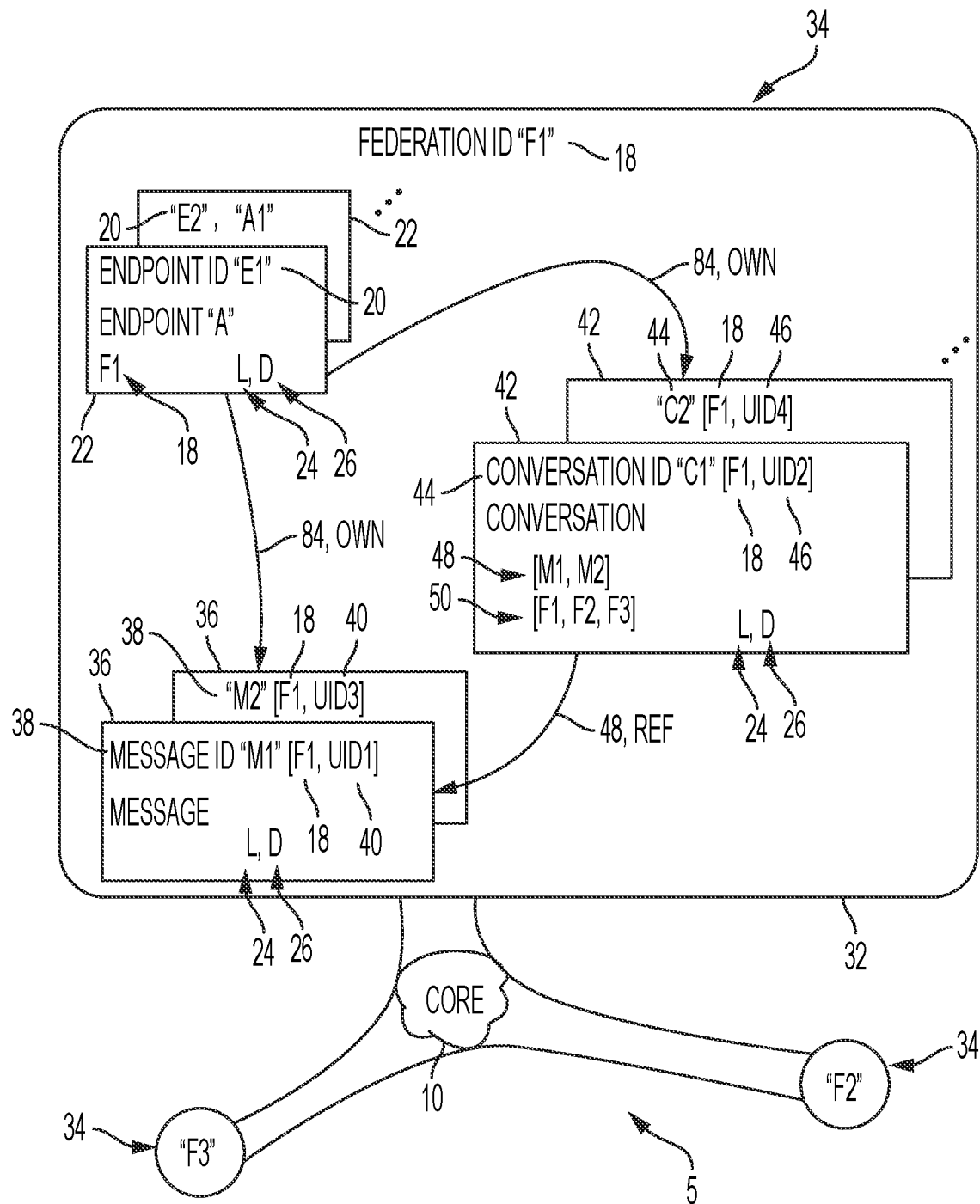
FIG. 2 illustrates example data structures generated and/or stored by an endpoint device associated with a federation identifier owned by a requesting user, for establishment and maintenance of two-way trusted relationships in the secure peer-to-peer data network, according to an example embodiment.

FIG. 2 illustrates example data structures that can identify secure relationships between different entities, for example different endpoint devices 12, different individual persons or organizations, etc. The secure private core network 10 causes each endpoint device 12 during registration with the secure private core network 10 to securely and randomly generate its own self-assigned 128-bit UUID as a unique endpoint identifier 20: the endpoint ID 20 is stored in a data structure referred to as an endpoint object 22 that stores all attributes associated with the corresponding endpoint device 12 in the secure data network 5. As illustrated in FIG. 2 and as described in further detail below, the secure private core network 10 can cause the endpoint device "A" 12 to generate its own endpoint identifier "E1" 20; the secure private core network 10 also can cause the endpoint device "A1" 12 to generate its own endpoint identifier "E2" 20. The endpoint ID 20 provides a permanent (i.e., unchangeable) cryptographically-unique identity for the endpoint device "A" 12.

Each physical device, including each endpoint device 12, is uniquely identified in the secure private core network 10 based on its corresponding endpoint object 22. The endpoint object 22 for each physical device can specify its corresponding endpoint ID 20, the federation ID 18 of the federation 34 to which the physical device belongs, a corresponding lifecycle policy "L" 24, and a corresponding distribution policy "D" 26, described below. The endpoint object 22 for each physical device also can identify a corresponding device type, for example a "human interface" (user interface device), a "thing" (e.g., IoT device, mass storage device, processor device), or a core network component (e.g., an MCP device 14, a replicator device 16, a directory server 28, a community server 30, etc.); hence, a particular device type as specified in the endpoint object 22 can cause the corresponding physical device (e.g., an endpoint device 12), to be allocated or granted selected attributes within the secure private core network 10. Each endpoint object 22 is securely stored in its corresponding physical device in which it represents, and also can be securely stored in other physical devices upon establishment of a two-way trusted relationship, described below.

A federation object 32 is a data structure that has its own unique federation ID 18 and comprises one or more endpoint objects 22: the federation object 32 is established upon secure registration of the first endpoint device 12 and establishment of its corresponding endpoint object 22. As described previously, an individual person (or identified organization) may utilize one or more endpoint devices 12 for network communications; hence, each endpoint object 22 is added to the federation object 32 in response to determining that the corresponding endpoint device (e.g., "A1") 12 has a two-way trusted relationship with a user (or organization) that has previously executed a secure registration with another endpoint device (e.g., "A") 12 in the same federation 32, described below. Hence, the secure private core network 10 can identify an individual person (or identified organization) based on a corresponding federation ID 18 that identifies a collection (i.e., "federation") 34 of one or more endpoint devices 12 having been verified by the secure private core network 10 as each having a secure relationship with the identified person or user.

Hence, a "federation entity" (or simply "federation") 34 as described herein is a logical entity in the secure data network 5, expressed in the secure private core network 10 by its corresponding federation object 32, that uniquely identifies the federation of secured endpoint devices 12 (identified by respective endpoint objects 22) that have a two-way trusted relationship with an individual user or organization. The secure private core network 10 establishes a trusted aggregation of strict two-way trusted relationships between two entities, where each endpoint device 12 of each federation 34 has its own permanent (i.e., unchangeable) and cryptographically-unique endpoint ID 20.

An endpoint device 12 in a federation 34 can generate content as a message object 36 that can be securely stored in one or more endpoint devices 12 in the federation 32. A message object can have different types including messages created within the secure private core network 10 (e.g., a notification object generated by an endpoint device 12 in the secure private core network 10), user created content from a user device 12 (e.g., a text message, an image, a media file, a media stream, etc.), or machine-created content from an IoT device (e.g., a sensor-based data record or media stream, an actuator message, etc.). A message object 36 is identified by a corresponding 256-bit unique message identifier 38 (illustrated in FIG. 2 as "M1" and "M2"): the message ID 38 comprises the federation ID 18 of the federation 34 in which the content was generated, and a corresponding 128-bit message UUID (e.g., "UID1") 40 that is generated by the endpoint device 12 in the federation 34 that generated the content. As described in further detail below, the generation of a message ID 38 that comprises the federation ID 18 provides an ownership reference 84 that establishes an absolute and exclusive ownership right in the content created by the federation 34, such that the content owner of the content in the message object 36 can be identified based on the federation ID 18 in the message ID 38. The message object 36 also can include a corresponding lifecycle policy "L" 24 (identifying for example an expiration date and time that identifies an instance that the associated content is to be automatically deleted from any physical storage device in the secure data network 5), and a corresponding distribution policy "D" 26 (identifying for example a distribution scope such as can only be shared by two users in succession, a distribution start or stop time for granting free access to media content for only one week before or after a concert performance date that is independent of replication of the media content throughout the secure data network 5, etc.). An endpoint device 12 in the federation 34 can distribute content that is stored in a message object 36 based on the endpoint device 12 generating a conversation object 42 comprising a conversation identifier (illustrated as "C1", "C2") 44 that comprises the federation ID 18 and a corresponding 128-bit conversation UUID (e.g., "UID2") 46 that is generated by the endpoint device 12 initiating the distribution of the content (i.e., initiating the "conversation"). The conversation object 42 can be of different types, for example a "post", a "community", a "vault" file system (for secure storage of selected messages at one or more locations). Hence, each conversation object 42 can include a message reference 48 of one or more message objects (e.g., "M1", "M2"); each conversation object 42 also can include a subscriber list 50 specifying at least the federation ID 18 of the federation 34 that created the content in the referenced messages "M1" and "M2" from the message reference 48. A given message (e.g., "M2") can be referenced in more than one conversation object (e.g., "C2"), enabling the message (e.g., "M2") to be replicated to different subscribers (e.g., federation "F2" 34 and federation "F3" 34) specified in the subscriber list 50 according to different policies specified by the corresponding lifecycle policy "L" 24 and the corresponding distribution policy "D" 26 in the conversation object "C2"; hence, the same message object 36 need not be duplicated as separate instances. Hence, a message ID 38 can be distributed according to different policies based on utilizing different conversation objects 42. Additional details regarding managing lifecycles for digital conversations can be found, for example, in U.S. Patent Publication No. 2021/0028940.

The federation object 32 can be implemented as a collection of the endpoint objects 22, message objects 36, and conversation objects that specify the same federation ID 18 as owner of the objects. In other words, the ownership within the same federation 34 is established based on storage of the same federation ID 18: within each endpoint object 22; within the message identifier 38 of each message object 36; and/or within the conversation identifier 44 of each conversation object 42. Hence, the federation object 32 can be implemented based on the federation ID 18 providing a reference to the owned endpoint objects 22, message objects 36, and conversation objects that can be stored at different locations within the memory circuit (94 of FIG. 4) of a physical network device; as a result, the federation object 32 need not be implemented as a discrete data structure that includes the owned objects 22, 36, and 38 stored therein.

Hence, each federation 34 in the secure data network 5 is a collection of one or more secured endpoint devices 12 (identified in the secure private core network 10 by its corresponding endpoint object 22) each of which have a two-way trusted relationship with an individual user or organization: each federation 34 is allocated a corresponding federation object 32 having a corresponding unique federation ID 18 that uniquely identifies the federation 34 in the secure data network 5. The federation object 32 can be stored in a memory circuit (94 of FIG. 4) of any one or more of the endpoint devices (e.g., "A") 12 of the federation "F1" 34.

An endpoint device "A1" 12 can initiate a prescribed secure salutation protocol with another endpoint device "A" 12 in order to establish a two-way trusted relationship between the two endpoint devices "A" and "A1" 12 in the federation "F1" 34, resulting in exchange of public encryption keys for pairwise sharing of encrypted content that cannot be decrypted by any intermediate device (e.g., a replicator device 16 in between two devices 12); hence, the addition of a new endpoint device (e.g., a new smartphone, a new smart tablet or laptop computer, etc. "A1") 12 by a user into the federation "F1" 34 enables the new endpoint device "A1" to execute a prescribed secure salutation protocol with at least one other endpoint device (e.g., endpoint device "A" 12), enabling the newly added endpoint device "A1" 12 in the federation "F1" 34 to establish a two-way trusted relationship with the other endpoint device (e.g., endpoint device "A" 12"). An example salutation protocol is illustrated in U.S. Patent Publication No. 2021/0029126.

The establishment of a two-way trusted relationship between the two endpoint devices 12 within the federation "F1" 34 enable the two endpoint devices 12 to execute autonomic synchronization of any portion of the data structures 22, 36, and 42 between any other endpoint device (e.g., "A1") 12 within the federation "F1" 34.

In particular, each physical network device (including each endpoint device 12) includes an autonomic synchronizer (52 of FIG. 1) that is configured for autonomically (i.e. automatically by a machine) synchronizing data structures between physical network devices that are trusted peer devices, for example between endpoint devices 12 that are identified as subscribers of the same conversation identifier 44 (based on the subscriber list 50): the autonomic synchronizer 52 can autonomically synchronize data structures between any pair of physical network devices having a two-way trusted relationship based on determining any differential hypercontent state (e.g., stored changes) between the stored data objects 22 identified in the message reference 48: the autonomic synchronizer 52 can reconcile any differential hypercontent state between any data objects 22 stored in different endpoint devices 12, resulting in updating the data objects 22 to a most recent version instantaneously in each endpoint device 12 connected to the secure data network 5; any disconnected endpoint device 12 can execute autonomic synchronization upon reconnection to the secure private core network 10, and/or in response to a local P2P (peer to peer) connection with a trusted peer endpoint device 12 (e.g., within its own federation 34 or another federation 34, as appropriate). Endpoint devices 12 within the same federation 34 also can execute autonomic synchronization of all data structures in the federation object 32 (including the federation object 32 itself), according to the policies set in the respective endpoint object 22. Hence, any endpoint device 12 (e.g., endpoint device "A1" 12) that is offline for some time interval can execute autonomic synchronization for updating of its stored content with the other endpoint devices 12 in its federation 34.

The autonomic synchronizer 52 is configured for executing pairwise synchronization between trusted peer devices 12 in response to each update to a data object. In particular, each and every data object that is created and stored in the secure data network 5 comprises a creation timestamp indicating a time that the data object was created, and a "last change" timestamp (i.e., update timestamp) indicating the last time the data object was updated. Hence, the autonomic synchronizer 52 can execute, in cooperation with a corresponding autonomic synchronizer 52 in a trusted peer device, a pairwise update of an older copy of each data object to the most recently available update based on comparing the relative update timestamps.

The autonomic synchronizer 52 of an endpoint device (e.g., "A") 12 utilizes a "database version number" for each other trusted physical network device (e.g., "A1", "R1", "B", "C", "MCP") in which the endpoint device "A" 12 has established a trusted relationship, resulting in a corresponding pairwise relationship in the database version number between trusted peer devices 12. In response to the trusted peer devices 12 connecting to each other (e.g., either directly via a P2P data link or via the secure private core network 10), the autonomic synchronizers 52 in the trusted peer devices 12 can track their respective database version numbers and in response can update their database versions along with the associated database changes.

Since different endpoint devices can be "online" or "offline" at different instances, a "disconnected" endpoint device (e.g., "A1") can develop changes or "versions" that "drift apart" from the synchronized versions among the trusted peer devices that are connected to the secure private core network 10, for example where a federation owner is updating a message object (e.g., a note or memorandum) 36 using the "disconnected" endpoint device (e.g., "A1"). Hence, the autonomic synchronizer 52 of an endpoint device (e.g., "B") 12 can respond to reconnection with the secure private core network 10 (or a trusted peer device 12 via a P2P data link) by comparing its "database version number" (e.g., the database version number associated with its peer "A") and determine if synchronization is needed.

The autonomic synchronizer 52 also can track changes of all locally-stored data objects based on creating a hash of a database state: the database state represents all locally-stored data objects as tuples of a data object identifier and the "last changed" timestamp. Example locally-stored data objects that can be generated by a federation owner on an endpoint device 12, and replicated and synchronized with other endpoint devices 12, can include: endpoint objects 22; conversation objects 42; message objects 36; outcasted endpoints, conversations and messages that are removed from a federation 34; membership of federations in conversations (e.g., subscriber lists 50); cohorts within a federation; voting state for conversations and messages; a vault file system within a federation; password recovery information for participants in password recovery; "shared" configuration between devices within a federation; etc.

Hence, any one or more of the endpoint devices 12 of a first federation (e.g., "F1") 34 can cause the secure private core network 10 to execute autonomic synchronization of any portion of the data structures 22, 36, and 42 in any other federation (e.g., "F2" or "F3") 34 in which the first federation has established a two-way trusted relationship, based on the subscriber list 50 in a given conversation object 42: the autonomic synchronization is executed in a secure manner that ensures that all data structures always stored securely in a non-transitory machine readable medium, and that all data structures are always transmitted securely, for example via a wireless (or wired) transmission medium.

For example, any data object (e.g., 22, 36, and/or 42) that is generated and stored within an endpoint device 12 (e.g., "A") can be encrypted using its public key (e.g., "KeyP1_A"); any data object that is sent from an originating endpoint device 12 (e.g., "A") to a cohort (e.g., "B") (either within its federation "F1" 34 or in another federation "F2" 34) for secure storage can be encrypted using the originator private key (e.g., "prvKeyP1_A") and the cohort public key (e.g., "Key_B"), and further encrypted using a temporal key prior to transmission to the cohort. The cohort can decrypt the transmitted data object based on the temporal key (described below) and store the object that was encrypted using the originator private key (e.g., "prvKeyP1_A") and the cohort public key (e.g., "Key_B").

As described below, the verified secure relationship is established via a "two-way trusted relationship" that is verified by the MCP device 14 via the first party (e.g., an individual person, organization, or another physical device) and via the second party (e.g., via the physical network device); in other words, no third-party authentication (e.g., by a certifying authority outside the authority of the secure private core network 10) is permitted in the secure private core network 10, nor is any one-way verification permitted in the secure private core network 10; hence, the trusted aggregation of multiple two-way trusted relationships establishes the hybrid peer-to-peer overlay network in the secure private core network 10.

Figure 3:
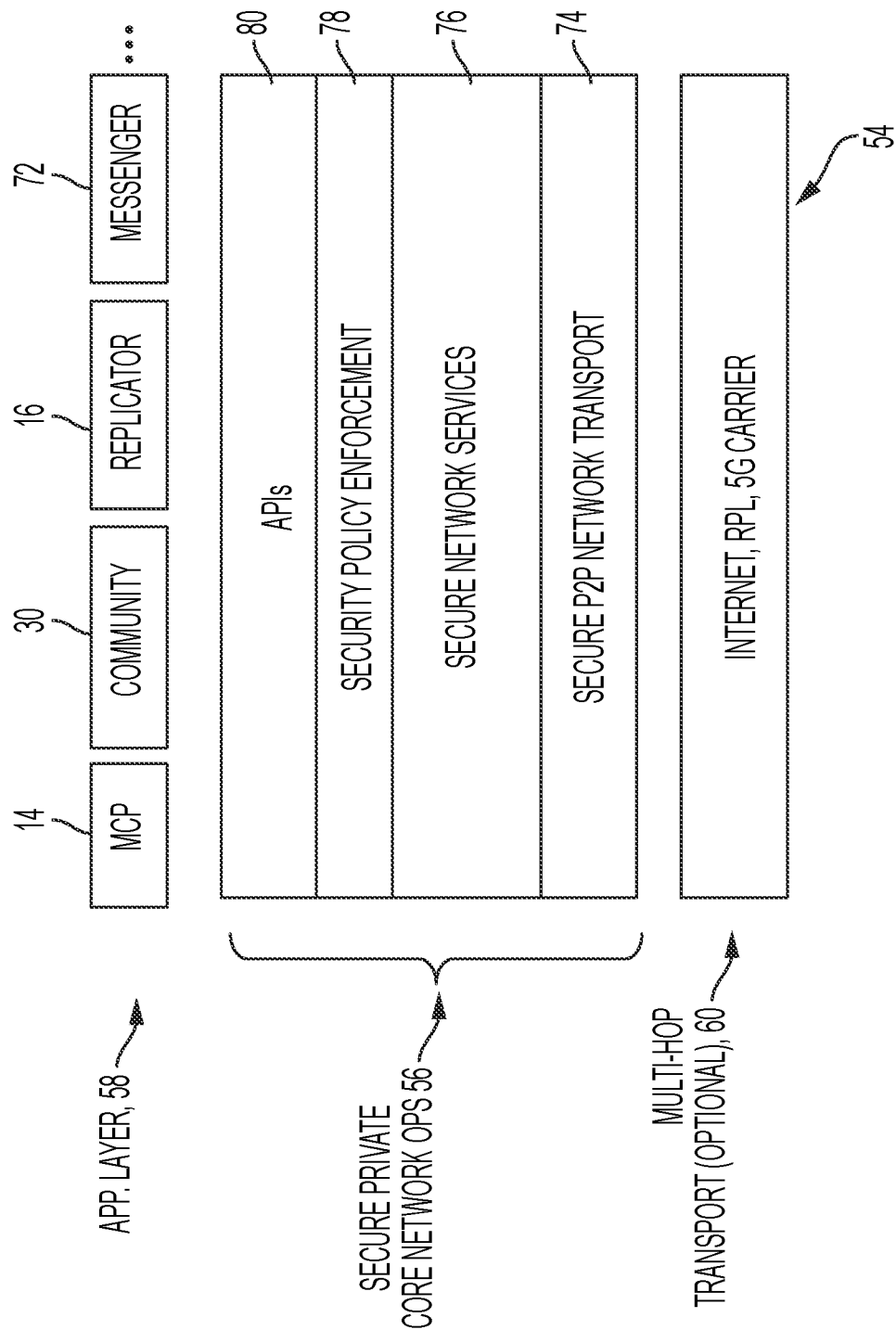
FIG. 3 illustrates an example implementation in an apparatus of executable code configured for providing operations for deployment of the peer-to-peer data network, according to an example embodiment.

FIG. 3 illustrates an example implementation 54 in a physical network device (e.g., an endpoint device 12) for deployment of the secure data network 5 in a physical data network, according to an example embodiment. The example implementation 54 includes execution of secure private core network operations 56, and execution of selected application layer resources 58 for formation of the secure data network 5. For example, the application layer resources 58 can include executable application code that causes a physical network device to selectively execute element-specific operations within the secure private core network 10, for example an MCP device 14, a replicator device 16, a community server 30; as shown in FIG. 1, additional application layer resources 58 that can be deployed in the secure private core network 10 by a physical network device (e.g., an endpoint device 12) can include a directory server 28 (hosted in the same network executing the MCP device 14), a community server 30 (hosted in the same physical network device executing the MCP device 14), and a load balancer 62 for allocating each endpoint device 12 to a replicator device 16. The application layer resources 58 also can include a messenger application 72 that enables a user of an endpoint device 12 (e.g., a 5G smart phone) to send and receive content using conversation objects 42, for example in the form of instant messages, public/private forum posts, etc. An example of the messenger application 72 is the commercially available application "Society" from WhiteStar Communications, Inc., Durham, North Carolina, at the website address "https://societyapp.io/".

The secure private core network operations 56 can be executed by each of the physical network devices in the secure data network 5 (including each of the endpoint devices 12) executing machine-executable code that can be implemented in each physical network device in the form of a self-contained "network operating system" (NOS) 56. The "network operating system" 56 can be implemented for deployment on various network device platforms, for example as a native operating system (e.g., for an IoT device or a physical network device dedicated for use in the secure data network 5), or as an executable "app" that can be installed and executed on a device utilizing an operating system such as Android, iOS, Microsoft Windows 10, or any other Unix-based operating system.

The network operating system 56 can include machine-executable code for executing numerous security-based operations in the secure data network 5, including establishment of a secure peer-to-peer (P2P) network transport 74 based on a dynamic generation of a unique encrypted temporal key for each and every data packet that traverses the secure data network 5, providing secure network services 76, providing security policy enforcement 78, and providing application programming interfaces (APIs) 80.

Example secure network services 76, illustrated in FIG. 1, can include machine-executable code for executing an Artificial Intelligence (AI) based security service 64 that comprises a guardian service 66, a sentinel service 68, and a navigator service 70. Additional example secure network services 76 can include machine-executable code for executing a prescribed secure salutation protocol with another physical network device (e.g., another endpoint device 12) for establishment of a secure two-way trusted relationship, executing management of messages or conversations (e.g., according to a lifecycle policy "L" 24 and/or a distribution policy "D" 26), executing management of secure and permanent deletion of data objects or an endpoint device 12 from the secure data network 5 ("zeroization"), account management, etc. Another example secure network service 76, illustrated in FIG. 1, includes machine-executable code for executing a distributed search (DS) agent 82: the distributed search (DS) agent 82 can execute AI analytics and generate metadata for AI operations; the distributed search (DS) agent 82 is configured for generation and selected synchronization of "projections" with other distributed search (DS) agents 82 that enable real-time searches to be executed by any endpoint device 12, an MCP device 14, any replicator device 16, a directory server 28 or community server 30, and/or any of the components of the AI-based security service 64.

The APIs provide prescribed commands that are available to the application layer resources 58 for execution of the secure private core network operations 56; moreover, the APIs 58 separate application logic from the need for any domain knowledge of the underlying data network that is implementing the secure data network 5. Hence, the example implementation 54 enables application developers to create the application layer resources 58 without any need of domain knowledge, and without any need to learn any security-based protocols, since the secure private core network operations 56 can ensure that the secure data network 5 provides a secure network that can prevent network intrusion.

As illustrated in FIG. 3, the example implementation 54 also can optionally include a multi-hop transport layer 60 that enables the secure data network 5 to be deployed overlying an existing network infrastructure, for example the Internet or another multi-hop data network (96 of FIG. 6), for example a private network provided by a wireless 5G service provider (e.g., Verizon, AT&T, etc.), or a private network constructed according to an alternative multi-hop protocol such as the Routing Protocol for Low Power and Lossy Networks (RPL) according to the Internet Engineering Task Force (IETF) Request for Comments (RFC) 6550. Hence, the secure data network 5 can be deployed as a private network (e.g., by a 5G service provider or a RPL-based network) for use by private subscribers, without any data traffic exposed to the Internet. The secure data network 5 also can be deployed, however, from the "ground up" based on an aggregation of multiple trusted P2P connections using the secure P2P network transport 74 across multiple physical network devices establishing a mesh of peer to peer connections via the pairwise topology 98 of replicator devices 16, resulting in the potential deployment of a worldwide deployment of a secure data network 5, without the Internet.

The security policy enforcement 78 provides an enforcement of application-level and user level "manners and semantics" that ensures compliance with digital rights and user relationship rights in the secure private core network 10. In one example, if an errant application (or user) attempted to modify content it did not have rights to (e.g., a user in the federation "F2" 34 attempted to modify content in a message ID 38 generated by the user of the federation "F1" 34 as identified by the federation ID "F1" 18 in the message ID 38), the security policy enforcement 78 can block the attempt to modify the content. As apparent from this example, the security policy enforcement 78 can prevent unauthorized manipulation of media content that has resulted in a proliferation of "deep fake" videos.

The security policy enforcement 78 also provides an enforcement of user digital rights, where at any time a user in the federation "F1" 34 can amend or delete instantaneously any one content item owned by the user (i.e., that includes the corresponding federation ID "F1" as part of its message ID 38): the security policy enforcement 78 can cause all autonomic synchronizers 52 that have a cohort relationship with the federation "F1" to instantly amend or delete the content item identified by its message ID 38.

The security policy enforcement 78 also can enforce various trust levels between an identified cohort, for example a progression from a transient trust (based on location proximity or common interests) to a permanent trust relationship; the security policy enforcement 78 also can enforce a revoked trust ("outcasting"), where the security policy enforcement 78 can respond to a user of the federation "F1" 34 wishing to revoke a relationship with the user of the federation "F2" 34; in this case, the security policy enforcement 78 can provide various warnings regarding revoking a relationship ("outcasting"), including loss of shared data, loss of shared contacts, etc.; as such, the security policy enforcement 78 can encourage dispute resolution between two parties to encourage that societal contracts are fulfilled.

The security policy enforcement 78 also can enforce proper semantic behaviors in the secure private core network 10, including ensuring API calls (by the APIs 80) are presented in the appropriate sequence (i.e., not out-of-order), and that a user of a federation 34 performs social-based operations in the secure private core network 10 in the appropriate order, e.g., a user cannot "join" a conversation without having been invited to join the conversation, and a user cannot "leave" a conversation without first being joined as a member, etc.

Hence, the example implementation 54 can ensure reliable establishment of cohorts, and can enforce security policies that ensure preservation of media rights and maintaining mutual trust between users via their federations 34.

A fundamental problem in the Internet is that prior to deployment of Dynamic Host Configuration Protocol (DHCP), IP addresses at first were allocated (in prescribed address ranges or "blocks") to organizations, and specific IP addresses could be fixed to a specific location (e.g., an office); hence, an Internet Protocol (IP) address had been used to identify a business, a business location (e.g., office location), a person (e.g., an individual utilizing an office having a network connection), and/or a physical network device (e.g., a personal computer operated by the person within the office and utilizing the network connection). However, the use of DHCP, NAT/PAT, wireless access on a guest network, etc., demonstrates than an IP address does not, in fact, accurately represent any one of a business, a location, a person, or a physical network device.

Another fundamental problem in the Internet is that it is built from its Border Gateway Protocol (BGP) core outward to BGP peers that operate as respective Autonomous Systems (ASs), to establish a BGP mesh network, each AS subdividing out from there toward a network edge; hence, a network is not considered "converged" until any one IP address (source address) can route a data packet to any other destination IP address. In addition to causing scaling problems as more networks and more devices are added to the Internet, this universal reachability from any source IP address to any destination IP address also introduces severe security threats since any "threat device" originating at a "source" IP address can threaten any "target device" at a "destination" IP address. In other words, anyone can obtain unrestricted access to the Internet via a threat device using a "source" IP address, and target devices at destination IP addresses need to expend significant resources to prevent intrusion by the threat device.

These security threats are magnified by orders of magnitude by cloud computing services using data centers worldwide for replication of data for cloud-based services: a successful attack on any one of the millions of IP addresses in use by a cloud computing service has the potential to disrupt the entire worldwide cloud computing service for millions of customers of the cloud computing service. Attempts to implement a "zero trust network" (e.g., at a utility company, a gas pipeline company, etc.) in order to avoid a cyber-attack are ultimately ineffective because a "threat device" still has Internet-based access to numerous entry points within the "zero trust network", which can be in the range of millions of IP addresses that the zero trust network relies on for cloud-based services: in other words, a zero trust network utilizing cloud-based services can have an attack surface area of over one million IP address.

The secure private core network 10 is implemented with the following security features and operations: the secure private core network 10 can provide full privacy for each endpoint device 12; the secure private core network 10 can ensure free association of users or their associated endpoint devices 12 (i.e., no third party can force a disassociation or disconnection between two associated users that have formed an association between each other); the secure private core network 10 can enable the protection of ownership of all content by users (i.e., user content cannot be "stolen" by another user); and the secure private core network 10 can eliminate the necessity for centralized services, controls, costs, such as found in a cloud-based computing system. The secure private core network 10 also can prevent unauthorized monetization of users' data, and also can facilitate integrated money exchange.

The secure private core network 10 is implemented as a hybrid peer-to-peer overlay network that does not contain any centralized controls as found in a cloud-based computing system; to the contrary, the secure private core network 10 can be composed based on aggregating a large number of small, decentralized, networks that are built by endpoint devices 12 at the "edge" of the network. Moreover, the secure private core network 10 can inherently implement security as a core policy (i.e., a "base tenant" of the secure private core network 10), where each decentralized network has a limited number of network nodes, and every user must "opt-in" before communicating with another network node.

Hence, the secure private core network 10 can initiate a two-device secure data network 5 between two endpoint devices 12 (e.g., between two individuals sharing data between two smart phones via a P2P link), and can aggregate additional devices 12 for eventual formation of a worldwide secure data network.

The secure private core network 10 comprises a single MCP device 14 that is implemented by a physical network device (e.g., an endpoint device 12) such as a user device, or a high-end computing device (e.g., a server device owned by a private network provider such as a 5G service provider, etc.) executing the executable application resource "MCP" 58 illustrated in FIG. 3; in other words, the MCP device 14 can be deployed as an executable application layer resource 58 that can be executed on any physical network device. In one example, a user device (e.g., a 5G smart phone) can initiate execution of the application resource "MCP" 58

(overlying the 5G smart phone execution of the secure private core network operations 56 as a "network operating system" app) for establishment of the secure data network 5 as a private peer-to-peer network in an isolated region that has a limited number of users (e.g., around twenty users in an isolated region that has no connection to a 5G service provider network or wide area network).

The MCP device 14 operates as a prescribed management agent in the secure peer-to-peer data network 5. Hence, only one MCP device 14 is executed in the secure data network 5 at a given time, even though an isolated secure data network 5 can have its own MCP device 14: hence, a physical network device must halt execution of its MCP device 14 prior to joining another secure data network 5 (e.g., executing a merge operation with a larger, pre-existing secure private core network 10 hosted by a 5G service provider). The MCP device 14 can manage subscriptions and registrations by individuals or businesses to the secure data network 5, accounting, load balancing (executed by the load balancer 62), endpoint-replicator assignment (including tracking endpoint—replicator connections for replicator queries), and software update compatibility enforcement. The MCP device 14 also can coordinate with AI-based assist operations provided for example by the AI-based security service 64 (e.g., connection assist using the navigator service 70, salutation assist, conversation assist using the community server 30, revocation assist, zeroization assist, etc.).

The MCP device 14 is connected to each and every replicator device 16, and can maintain a mapping of every endpoint device 12 to a state (either offline or connected to an identified replicator device 16).

The replicator device 16 can be deployed as an executable application layer resource 58 that can be executed on any physical network device. Each replicator device 16 can establish a secure two-way trusted relationship with the MCP device 14 using a prescribed secure salutation protocol that includes negotiation of a public key pair; each replicator device 16 also can establish a secure two-way trusted relationship with all other available replicator devices 16 (using a prescribed secure salutation protocol that includes negotiation of a public key pair) to form a pairwise topology 98 (i.e., one logical hop between each replicator); each replicator device 16 can provide connections between endpoint devices 12 using various secure network transport operations, including crypto-signed switching described below. Hence, each endpoint device 12 can be connected to another endpoint device by zero logical hops (pure peer-to-peer (P2P) connection "A-A1" in FIG. 1), one logical hybrid P2P hop (e.g., "B-R100-C"), or two-logical hybrid P2P hops (e.g., "A-R1-R100-B"). Each logical connection is based on a first party trusted relationship established by a replicator (e.g., replicator device "R1" 16) and its peer replicator (e.g., replicator device "R100" 16). Replicator devices 16 each include a flow table (forwarding information base) for forwarding received packets after packet authentication.

The directory server 28 can be executed by MCP device 14. The directory server 28 is configured for managing ontologies of data structures (e.g., caching intermediate results), storing tags, federation IDs etc. (for projections, e.g., parallel searches by the distributed search (DS) agent 82 of one or more physical network devices such as endpoint devices 12).

The community server 30 can be executed by the MCP device 14 and/or any endpoint device 12; the community server 30 is configured for hosting posts within a public and/or private community in the secure private core network 10.

The guardian service 66 can be executed as part of the secure network services 76 and can manage protection of data during transmission ("in-flight") and while stored on a machine-readable non-transitory storage medium ("at rest"), including maintaining persistence of endpoint objects 22, conversation objects 42, and message objects 36 according to the associated lifecycle policy "L" 24 and distribution policy "D" 26.

The navigator service 70 can be executed as part of the 76 and can manage connectivity graphs for how to connect cohorts; the navigator service 70 also can warn the sentinel service 68 of detected threats, and the navigator service 70 can respond to threats detected by the sentinel service 68.

The sentinel service 68 can be executed as part of the secure network services 76 and can detect threats in real time, mitigate against detected threats (e.g., warning user, automatic mitigation operations, etc., notifying the navigator service 70), etc.

The guardian service 66, sentinel service 68, and navigator service 70 executed as part of the AI-based security service 64 in the secure network services 76 is scalable in that every physical network device can execute the various services 66, 68, and 70 at a scale corresponding to the associated application operations 58 of the physical device executing the associated application layer resources 58; hence, executable agents operating in one endpoint device (e.g., "A" 12) can securely communicate and share metadata with agents operating in other physical network devices (e.g., "R1", "R100", the MCP device 14, endpoint device "B" 12) to localize and identify potential threats and prevent any attacks within the secure private core network 10. Hence, the AI-based security service 64 can manage user metadata in order to enhance user security, as opposed to monitoring user metadata for monetizing.

The distributed search (DS) agent 82 can execute projections: in relational algebra a projection refers to a subset of columns of information; hence, a distributed search (DS) agent 82 can apply a subset of information from a data structure (e.g., a federation ID 18, endpoint ID 20, message ID 38, conversation identifier 44, endpoint object 22, message object 36, conversation object 42 or a hypercontent component thereof), to decompose a mapping of a database lookup into a set of queries and subqueries; the generation of a projection enables execution of parallel distributed searches. A projection can be created by a distributed search (DS) agent 82 executed by any physical network device within the secure data network 5. A projection generated by a distributed search (DS) agent 82 can have a defined scope (or "extent"), for example, local, within a federation 34, within a conversation, global, etc.; a projection also can have different types (e.g., one-time, until a deadline, etc.), and can be named with arbitrary names (e.g., contact lookup, signet scan, etc.). Each projection defines an arbitrary number of "projection entries" that are used to match fields using various search techniques, and to select which fields associated with the matches should be returned; the fields can be arbitrary types of information in the secure data network 5 (e.g., signet, endpoint ID 20, email address, tag, message ID 38, conversation identifier 44, titles, names, hypercontent, URLs, etc.), and the values for matches can be exact matches or regular expressions ("regex") comprising a sequence of characters that have a matching pattern. Each projection entry can select a number of fields that should be returned when matches select information: if no matches are found for a projection entry then no record is returned; for matches, values for the fields selected are returned along with the associated projection entry tag.

Hence, a distributed search (DS) agent 82 can execute a projection that has a scope that limits the extent of a search: the scope can be limited at different locations: for example a scope can limit a search by an endpoint device 12 to a common word usage, old passwords, etc.; a scope can limit a search by a replicator device 16 to GIF image searches, for example; a scope can limit a search by the MCP device 14 to limited fields to preserve privacy of users of the endpoint devices 12, for example limiting searches to a hash of a user email (and not the actual email which is not made available to the MCP device 14), federation ID 18, endpoint ID 20; a scope also can limit a search by the directory server 28 and/or the community server 30. Projections can be executed once, continuously, periodically, until a prescribed "event" deadline (e.g., time expiration, project deadline reached, etc.).

A distributed search (DS) agent 82 also can obtain metadata from other agents executed in the secure private core network 10 to extract feature graphs for assistance in AI-based decisions such as recommendations whether to accept connection requests or conversation requests, keyboard word suggestions, etc.

Hence, the implementation of the secure private core network 10 as a cloudless hybrid peer-to-peer overlay network enables every person and every device to be securely connected, and as such is a realization of "Metcalf's Law" that the value of a telecommunications network is proportional to the square of the number of connected users of the system. The implementation of the secure private core network 10 as a cloudless hybrid peer-to-peer overlay network can extend security features and security operations that mimic social networks without technical constraints, and the use of AI enables the secure private core network 10 to fit policy and interaction requirements of individual users (i.e., people), as opposed to requiring people to adapt to technical constraints.

Hence, the aggregation of two-way trusted relationships in the secure private core network 10 ensures that any attack surface area within the secure data network 5 is limited to two devices at any time, requiring any "threat device" to successfully hack the secure keys of the two peer devices before being able to compromise only the pairwise-encrypted content shared only between the two peer devices; hence, any further attack would require the threat device to successfully hack a next pair of secure keys, etc.

The secure private core network 10 also can include a sensor network comprising one or more sensor devices (e.g., Internet of Things-based sensor devices): each sensor device has a trusted relationship with at least another sensor device, or a trusted relationship with another entity that enables the sensor device to associate with a single individual, a PAN, a room area network, etc.

Depending on implementation, the secure data network 5 can be established as an aggregation of decentralized secure networks. Each decentralized network can be connected to another decentralized network by one or more private dedicated optical fiber connections ("dark fiber pairs") that are part of a private backbone network: the private backbone network can utilize one or more optical network carriers on diverse fiber paths in order to provide a regionally redundant connectivity over large geographic areas (e.g., providing connectivity between eastern United States, southwest United States, Midwest United States, etc.). Sub-oceanic fiber paths and/or satellite communications also can be used to extend the private backbone network in one geographic region to a worldwide private backbone network. The private backbone network also can be managed by a "bare metal infrastructure" where any server devices executing any network-based operations are single-tenant server devices, i.e., the server devices are reserved for the exclusive use of the private backbone network only, with no use by a third-party tenant permitted (as opposed to existing cloud computing systems that can "share tenants" on a single network device). Further, all data in the private backbone network is always encrypted by default, regardless of whether the data is stored on a non-transitory machine-readable storage medium (i.e., "at rest"), or whether the data is undergoing wired or wireless transmission (i.e., "in transit").

Hardware Device Overview

Figure 4:
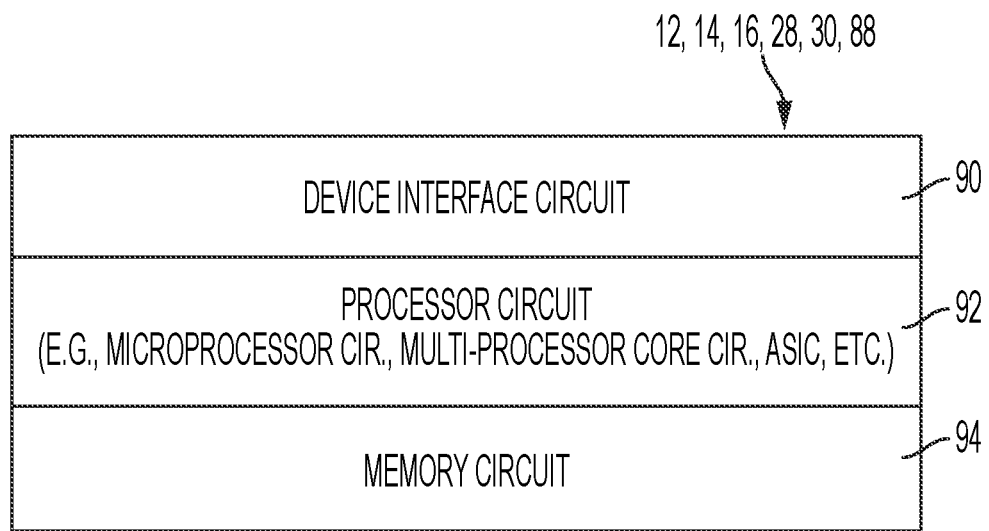
FIG. 4 illustrates an example implementation of any of the network devices described with reference to any of the Figures, according to an example embodiment.

FIG. 4 illustrates an example implementation of any one of the physical network devices shown in any of the other Figures (e.g., 12, 14, 16, 28, 30, and or 88 of FIGS. 1, 2, and/or 6), according to an example embodiment.

Each apparatus (e.g., 12, 14, 16, 28, 30, and or 88 of FIGS. 1, 2, and/or 6) can include a device interface circuit 90, a processor circuit 92, and a memory circuit 94. The device interface circuit 90 can include one or more distinct physical layer transceivers for communication with any one of the other devices (e.g., 12, 14, 16, 28, 30, and or 88); the device interface circuit 90 also can include an IEEE based Ethernet transceiver for communications with the devices of FIG. 1 via any type of data link (e.g., a wired or wireless link, an optical link, etc.). The processor circuit 92 can be configured for executing any of the operations described herein, and the memory circuit 94 can be configured for storing any data or data packets as described herein.

Any of the disclosed circuits of the devices (e.g., 12, 14, 16, 28, 30, and or 88) (including the device interface circuit 90, the processor circuit 92, the memory circuit 94, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 94) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 94 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 94 can be implemented dynamically by the processor circuit 92, for example based on memory address assignment and partitioning executed by the processor circuit 92.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Identity Management System Forming Two-Way Trusted Relationships

The following description summarizes the establishment of the secure peer-to-peer data network 5 as a trusted aggregation of two-way first-party trusted relationships, also referred to as "cohorts". Each two-way first-party trusted relationship requires a requesting party "X" to send a relationship request directly to a recipient party "Y" (the first "way" of the two-way first-party trusted relationship), i.e., no "requesting agent" can act on behalf of the requesting party "X" without explicit authorization from the requesting party "X" to send the request; similarly, no "receiving agent" can act on behalf of a recipient party "Y" without explicit authorization from the recipient party "Y". The relationship request can include a secure public key "Key_X" associated with the requesting party "X" (i.e., the requesting party "X" owns a private key "prvKey_X" corresponding to the secure public key "Key_X"), as opposed to relying on any trust in a secure certificate issued by a third party certifying authority. The recipient party "Y" can decide to accept the request or deny the request; if the recipient party "Y" decides to accept the relationship request, the recipient party "Y" can store the secure public key "Key_X" and send to the requesting party "X" an acknowledgment that contains the secure public key "Key_Y" of the recipient party "Y" (i.e., the recipient party "Y" owns a private key "prvKey_Y" corresponding to the secure public key "Key_Y"). The acknowledgment can be encrypted using a temporal key generated by the recipient party "Y": the recipient party can encrypt the temporal key using the secure public key "Key_X", and add to the encrypted acknowledgment (containing the secure public key "Key_Y") the encrypted temporal key. Encryption can be executed, for example, using data encryption standard (DES), TripleDES, RSA, Advanced Encryption Standard (AES), ECIES, etc.

Hence, the requesting party "X", in response to receiving the encrypted acknowledgment containing the encrypted temporal key, can recover the temporal key based on decryption using the corresponding private key "prvKey_X", and decrypt the encrypted acknowledgment using the recovered temporal key to obtain the secure public key "Key_Y". Hence, the two-way first-party trusted relationship between the parties "X" and "Y", or "cohort" between "X" and "Y", can be securely maintained based on the secure storage of data ("at rest") using the key pairs "Key_X" and "Key_Y"; secure communications between the endpoint devices 12 associated with the cohort "X" and "Y" also can be secured based on encrypting each data packet prior to transmission using a temporal key, where the temporal key also is encrypted (using the key of the destination device) to form an encrypted temporal key that is supplied with the encrypted data packet for decryption at the destination.

The aggregation of cohorts between two endpoint devices 12 (pairs of pairs of pairs) ensures that the attack surface area in the secure data network 5 is no more than two ("2") devices, regardless of the size of the secure data network 5. Use of encrypted temporal keys ensures that every transmitted data packet has a different key needed for decryption following transmission. Every data structure stored in the secure data network 5 has a different encryption with a different key, such that the "prize" for hacking a stored data file is only the one hacked data file.

Figure 5A:
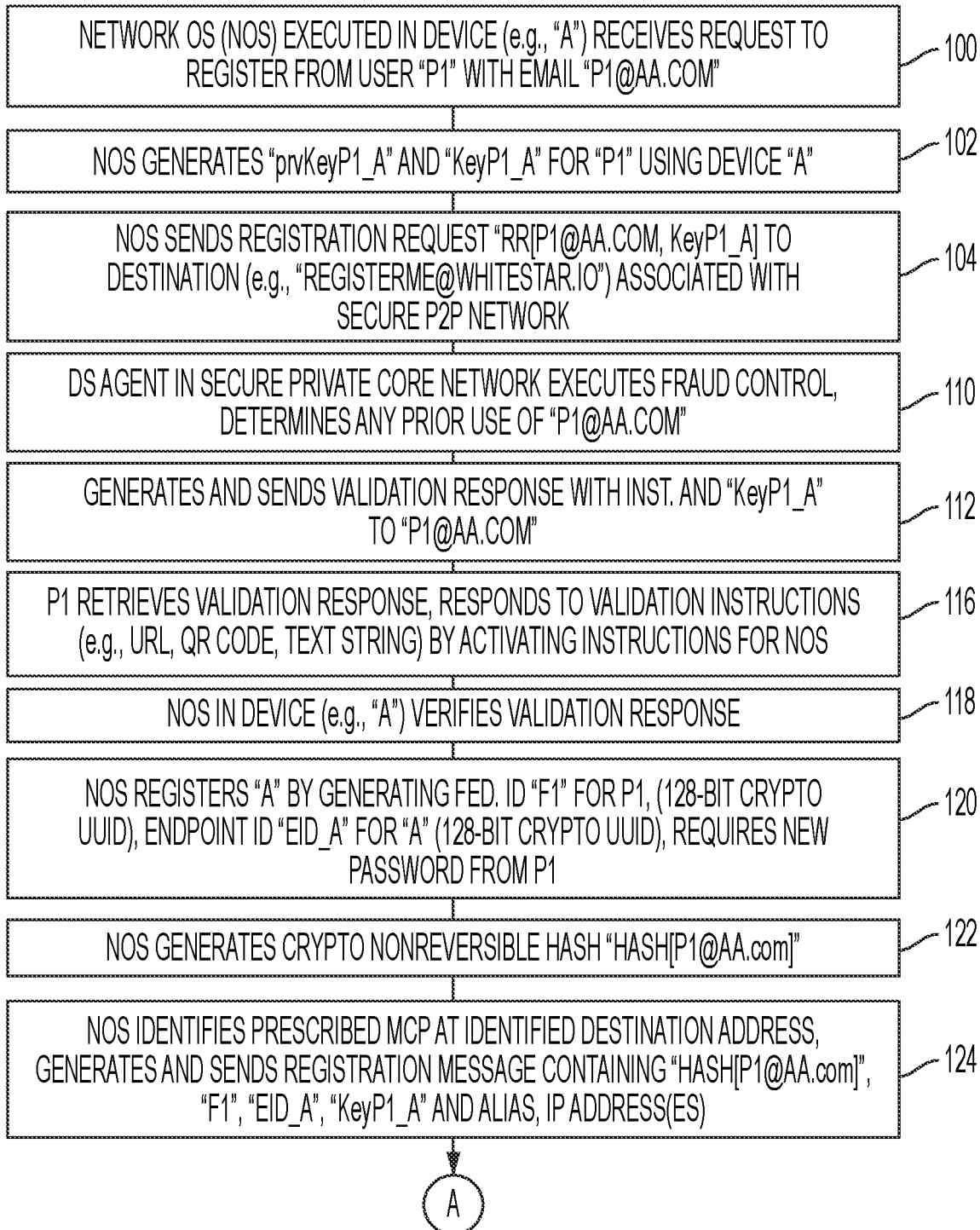
FIGS. 5A and 5B illustrate an example method of executing an identity management system for registering a requesting user based on establishment of a two-way trusted relationship, including creating a federation identifier in the secure peer-to-peer data network for the requesting user, according to an example embodiment.
Figure 5B:
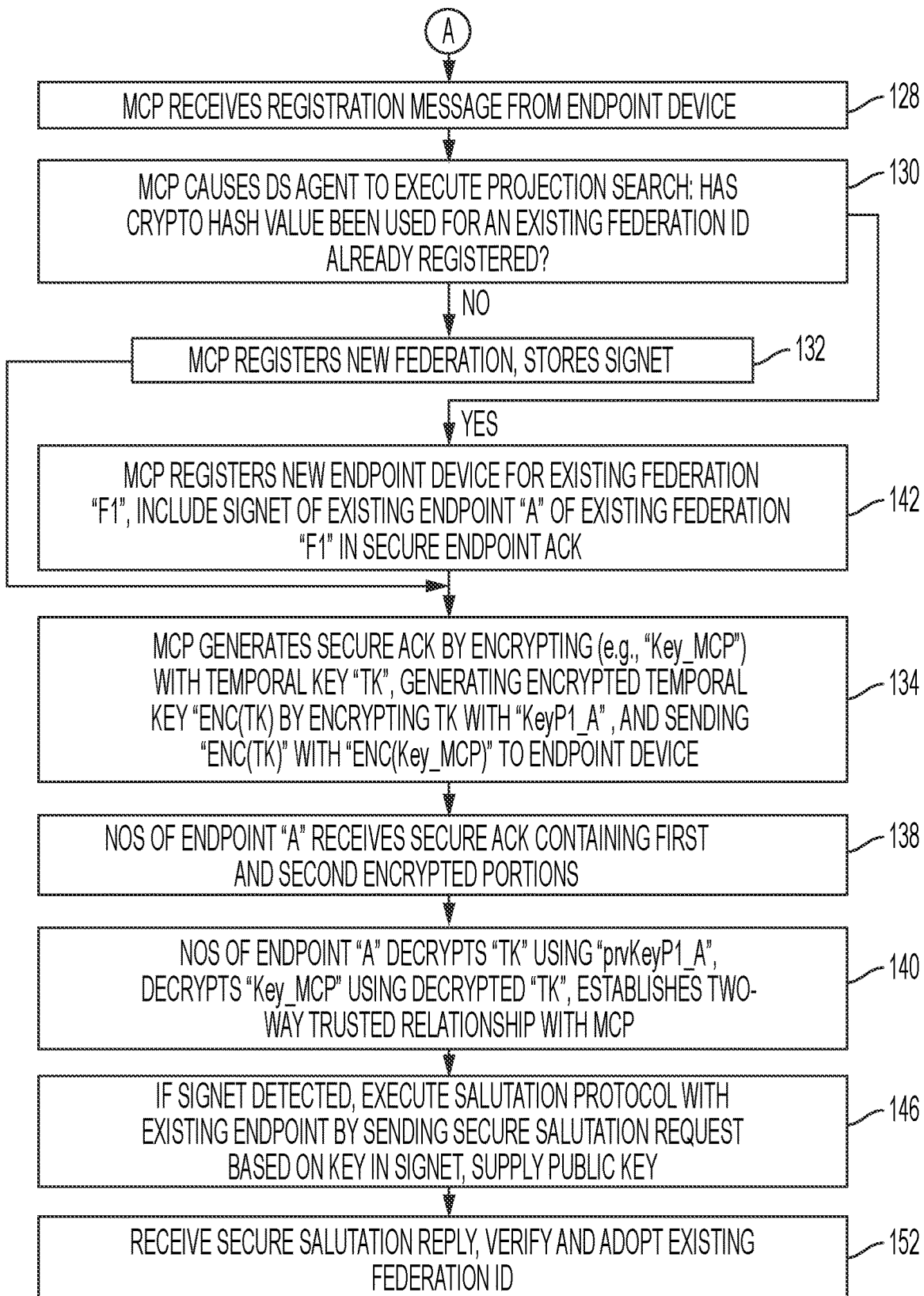
Figure 6:
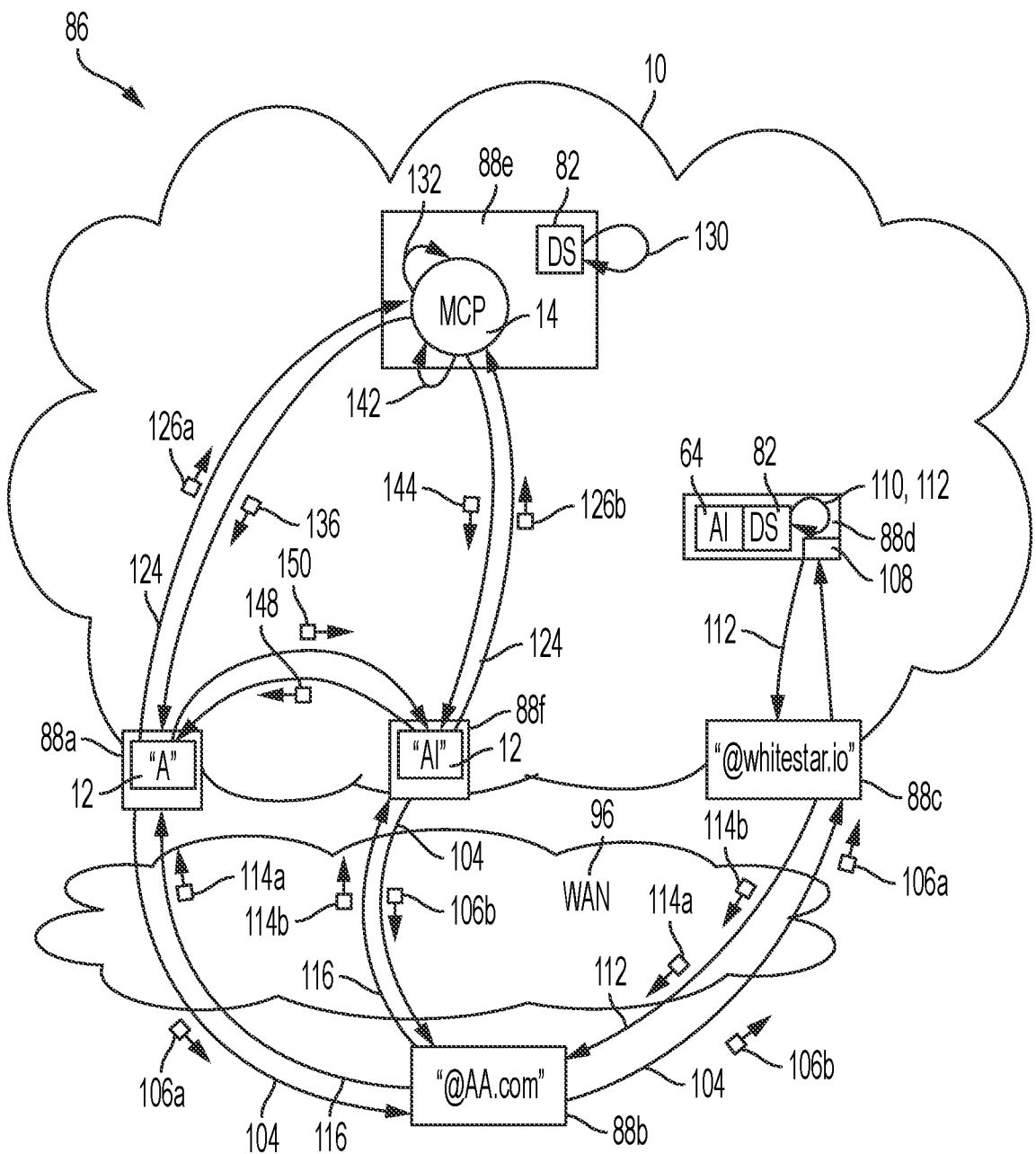
FIG. 6 illustrates in further detail interactions between user-controlled network devices, server network devices in an external data network, and one or more server network devices in the secure peer-to-peer data network, in establishing a two-way trusted relationship for creation of a federation identifier in the secure peer-to-peer data network for the requesting user and an endpoint identifier associated with the federation identifier for each endpoint device of the requesting user, according to an example embodiment.

FIGS. 5A, 5B and 6 illustrate an example identity management system 86 that can be implemented in the secure private core network 10 for secure establishment of trusted relationships in the secure data network 5, according to an example embodiment. A new subscriber "P1" can operate his or her physical network device (88a of FIG. 6) to cause the processor circuit 92 of the physical network device 88a to download and install, for example via an external data network 96 distinct from the secure peer-to-peer data network 5, an executable application (e.g., an "app") that includes a desired application (e.g., a messenger application 72 of FIG. 3) and the network operating system (NOS) 56. The new subscriber "P1" as a "requesting party" can enter via the device interface circuit 90 of the physical network device 88a a command that causes the processor circuit 92 to start ("instantiate") the executable application executing the secure private core network operations 56 on the physical network device 88a as an endpoint device "A" 12, causing an account management service executed in the secure network services 76 to prompt the new subscriber "P1" to register by entering an external network address such as a valid email address of the new subscriber "P1" (e.g., "P1@AA.com"), a mobile number used to receive text-based or image-based messages, etc., where the external network address is used by the requesting party "P1" for reachability via an external data network 96 distinct from the secure peer-to-peer data network 5.

In response to the secure network services 76 (executed by the processor circuit 92 in the physical network device 88*a*) receiving in operation 100 the request by the user "P1" to register the physical network device 88*a* as an endpoint device "A" 12, including the external network address (e.g., "P1@AA.com") of the user "P1", the processor circuit 92 of the physical network device 88*a* executing the account management service in the secure network services 76 on the endpoint device "A" 12 can respond to the external network address entry (e.g., email address) by causing the secure network services 76 in operation 102 to generate a unique private key "prvKeyP1_A" and a public key "KeyP1_A" for the requesting party "P1" on the new endpoint device "A" 12. The account management service executed in the secure network services 76 by the processor circuit 92 on the endpoint device "A" 12 can generate and send in operation 104 a registration request (containing the secure public key "KeyP1_A") 106*a* to a prescribed destination 108 associated with the secure private core network 10 (e.g., a destination email address "registerme@whitestar.io" owned by the secure private core network 10) that is reachable outside the secure private core network 10 via the external data network 96 (e.g., the Internet, a 5G carrier, etc.). Hence, the device interface circuit 90 of the physical network device 88*a* can output, via the external data network 96, the registration request 106*a* received from the processor circuit 92 executing the NOS 56 for transmission, via the external data network 96, to a physical network device 88*b* hosting a messaging service (e.g., email server "@AA.com") for the subscriber "P1"; the messaging server 88*b* can forward the message 106*a*, via the external data network 96, to a physical network device 88*c* hosting a messaging service (e.g., email server "@whitestar.io") associated with the secure private core network 10 of the secure peer-to-peer data network 5.

The prescribed destination 108 of the registration request 106*a* can be hosted by the same physical network device 88*c* receiving the registration request 106*a* from the transmitting messaging server 88*b* or a different physical network device (e.g., 88*d*) in the secure private core network 10 (e.g., within a replicator device 16). The physical network device (e.g., 88*c* or 88*d*) hosting the prescribed destination 108 can cause its processor circuit 92 to execute a distributed search (DS) agent 82 in order to execute fraud control in operation 110 using the AI-based security service 64, including determining whether the external network address (e.g., email address "P1@AA.com") specified in the registration request 106*a* has been previously been used for any registration in the secure private core network 10, whether the external network address has been previously outcasted or "banned" by another subscriber or any AI-based security service 64 as owned by an untrusted party, etc.; the distributed search (DS) agent 82 (executed in the physical network device 88*c* or 88*d*) having received the registration request 106*a* can limit the scope in the availability of the external network address to prevent the MCP device 14 from obtaining any external network address (e.g., email address) "in the clear", for example based on limiting any validation of email addresses to only hashes of email addresses, described below.

In response to detecting that the external network address (e.g., email address) in the registration request is a new external network address and does not appear to be fraudulent, the distributed search (DS) agent 82 (executed in the physical network device 88*c* or 88*d*) that executed the fraud control can validate that the external network address can be trusted: in response, the distributed search (DS) agent 82 in operation 112 can cause the secure private core network 10 to generate and send a validation response (e.g., email message, text message, etc.) 114*a* to the external network address of the new subscriber "P1" (e.g., email "P1@AA.com" hosted by the physical network device 88*b*) via the external data network 96, where the validation message 114*a* can include the secure public key "KeyP1_A" generated by the secure network services 76 on the new device "A" 12: the secure public key "KeyP1_A" supplied in the registration request can be expressed in the validation message 114*a* in different forms, for example a QR code, a URL, or a text string.

Hence, the new subscriber "P1" in operation 116 can utilize the physical network device 88*a* (or another physical network device 88, as appropriate) to retrieve the validation response from the messaging server 88*b* "out of band" (i.e., outside the secure private core network 10): the validation response 114*a* specifies instructions enabling the new subscriber "P1" in operation 116 to submit the secure public key "KeyP1_A" for validation by the secure network services 76 executed on the new device "A" 12, for example in the form of a machine readable QR code, a URL link, or a machine-readable text string.

In response to the secure network services 76 executed on the new device "A" 12 (by the processor circuit 92 of the physical network device 88*a*) verifying in operation 118 the secure public key "KeyP1_A" in the validation response 114*a*, the secure network services 76 executed on the new device "A" 12 in operation 120 can register the physical network device 88*a* as the endpoint device "A" 12 based on auto-generating (crypto-generating) a federation ID "F1" 18 that is allocated to the email address "P1@AA.com" used by the subscriber "P1", thereby establishing a relationship between the email address "P1@AA.com" and the endpoint device "A" 12. The network operating system 56 executed in the endpoint device "A" 12 (within the physical network device 88*a*) in operation 120 executes registration also based on prompting the new subscriber "P1" to create a new password for entry into the secure data network 5, and by auto-generating (crypto-generating) an endpoint ID 20 for the endpoint device "A" 12 that is a 128 bit UUID (e.g., "EID_A" in FIG. 5A; "E1" in FIG. 2). The creation of a new password by the network operating system 56 ensures that the requesting party "P1" retains exclusive "ownership" (i.e., possession and control) of the endpoint device "A" 12, and thus establishes a two-way trusted relationship between the requesting party "P1" and the corresponding network device "A" based on the requesting party retaining possession and control of the network device.

If the physical network device 88*a* is to be shared with a second user (e.g., "P3"), then the network operating system 56 can establish a second "profile" for the second user "P3", enabling the second user "P3" to register via the identity management system as described herein for creation of a different federation ID (e.g., "F6") 18 and a different endpoint ID (e.g., "E6") 20 for the same physical network device; in this case, the endpoint object 22 specifying the endpoint ID (e.g., "E6") 20 for the physical device used by the second user "P3" can include a reference indicating the physical network device is shared separately by two federations (e.g., "F1" and "F6"); as apparent from the foregoing, there is no sharing between the two federations sharing the same physical network device unless a two-way trusted relationship is established between the two federations (e.g., "F1" and "F6") according to the prescribed secure salutation protocol.

Hence, the network operating system 56 executed in the endpoint device "A" 12 (by the processor circuit 92 of the physical network device 88*a*) can store in the memory circuit 94 of the endpoint device "A" 12 a federation object 32 that comprises the federation ID 18 and the endpoint object 22 having an endpoint ID "E1" 20 that uniquely identifies the endpoint device "A" 12 in the secure private core network 10. The federation object 32 stored in the endpoint device "A" 12 identifies the federation "F1" 34 within the secure private core network 10.

The network operating system 56 executed in the endpoint device "A" 12 IN OPERATION 122 also can generate a cryptographic nonreversible hash of the external network address (e.g., email address "P1@AA.com"), for example "HASH[P1@AA.com]", that is considered in the secure private core network 10 an acceptable identifier for the federation 34 that is also identified by the federation ID "F1". The nonreversible hash of the external network address guarantees anonymity of the user "P1" while maintaining absolute identity control; hence, an email address of an existing federation 34 can be protected against subsequent registration requests based on utilizing the nonreversible hash of the email address.

The network operating system 56 executed in the endpoint device "A" 12 in operation 124 can identify the MCP device 14 as a prescribed management agent in the secure peer-to-peer data network 5, establish a connection with the MCP device 14 (e.g., via an IP address that is made available to the network operating system executed in the endpoint device "A" 12), and generate and supply a registration message 126*a* comprising its cryptographic nonreversible hash (e.g., its hashed email address "HASH[P1@AA.com]"), its federation ID "F1" 18, and its endpoint ID "EID_A" 20 that is owned by the federation ID "F1" (e.g., "HASH[P1@AA.com]→F1" and "F1→['EID_A']") (the network operating system 56 executed in the endpoint device "A" 12 also can include its public key "KeyP1_A"). The registration message also can include one or more network addresses (e.g., IP addresses) used by the endpoint device "A" 12 for communications via a data network 96 as a multi-hop transport layer (60 of FIG. 3) underlying the secure peer-to-peer data network 5. The registration message also can specify an "alias" used by the endpoint device "A" 12 as a reference for identifying a keypair (e.g., "KeypairP1_A"), where the network operating system 56 executed in the endpoint device "A" 12 can generate multiple private/public key pairs having respective aliases, for example different cohorts, different data flows, etc.

Referring to FIG. 5B, processor circuit 92 of the physical network device 88*e* executing the MCP device 14 in operation 128 can respond to receiving the registration message 126*a* by causing its distributed search (DS) agent (82 of FIG. 1) to execute in operation 130 a projection search on the supplied identifiers "HASH[P1@AA.com]", "F1" 18 and/or "EID_A" 20 to determine if there are any matches. For example, the distributed search (DS) agent 82 can execute a projected search of the cryptographic nonreversible hash "HASH[P1@AA.com]" to determine in operation 130 if there is a match indicating the cryptographic nonreversible hash (generated using the same external network address) has already been used for an existing federation identifier 18 that is already registered in the secure peer-to-peer data network 5.

In response to the distributed search (DS) agent 82 finding no other matches in operation 130, the MCP device 14 in operation 132 can register the new federation 34. Hence, the registration message 126*a* enables the MCP device 14, as the prescribed management agent for the secure data network 5, to associate the federation ID "F1" 18 as owning the cryptographic hash "HASH[P1@AA.com]" and the endpoint identifier "EID_A" 20; the registration message 126*a* further enables the MCP device 14 to associate the secure public key "KeyP1_A" with the endpoint identifier "EID_A" 20 owned by the federation ID "F1" 18. As described below, the registration message enables the MCP device 14 to generate and store in operation 132 a data structure, referred to as a "signet", that comprises the secure public key "KeyP1_A" of the endpoint device "A" 12, the "alias" used by the endpoint device "A" 12, a list of one or more network addresses (e.g., IP addresses) usable by the endpoint device "A" 12 for communications via an underlying data network 96 used as a multi-hop transport layer 60, and the endpoint ID "EID_A" 20 of the endpoint device "A" 12.

The MCP device 14, in response to determining there are no matches on the supplied identifiers "HASH[P1@AA.com]", "F1" 18 and/or "EID_A" 20 (indicating an absence of any previous use of the cryptographic nonreversible hash), can acknowledge the registration message based on generating and sending to the endpoint device "A" 12 in operation 134 a secure registration acknowledgment 136 indicating that there are no other endpoints, and can include a public key "Key_MCP" of the MCP device 14; the MCP device 14 can encrypt the public key "Key_MCP" with a temporal key (resulting in the encrypted data structure "ENC(Key_MCP)"), encrypt the temporal key with the secure public key "KeyP1_A" of the endpoint device "A" 12, and supply the encrypted temporal key "ENC(TK)" in the secure registration acknowledgment 136 with the encrypted data structure "ENC(Key_MCP)" to the endpoint device "A" 12. The supplied identifiers "HASH[P1@AA.com]", "F1" and "EID_A" also can be supplied by the MCP device 14 to the directory server 28 for subsequent projection searches in the secure private core network 10.

The network operating system 56 of the endpoint device "A" 12 in operation 138 can receive the secure registration acknowledgment 136 containing a first encrypted portion ("ENC(TK)") and a second encrypted portion "ENC(Key_MCP)". The supply of the encrypted temporal key "ENC(TK)" with the encrypted acknowledgment "ENC(Key_MCP)" in the secure registration acknowledgment 136 enables the network operating system 56 executed in the endpoint device "A" 12 in operation 140 to decrypt the temporal key "TK" using its private key "prvKeyP1_A", decrypt the acknowledgment using the decrypted temporal key "TK", and obtain the secure public key "Key_MCP" of the MCP device 14. Hence, the sharing of secure public keys between the endpoint device "A" 12 and the MCP device 14 establishes a two-way trusted relationship between the endpoint device "A" 12 and the MCP device 14 in the secure private core network.

Hence, at this stage the federation object 32 contains only the endpoint object 22 having an endpoint ID "E1" 20 that uniquely identifies the endpoint device "A" 12 used for initial registration with the secure private core network 10.

Referring to FIGS. 5A, 5B, and 6 the same user "P1" can register a physical network device 88f as a new device "A1" 12 based on installing and instantiating the network operating system 56 on the physical network device 88f, and entering the same external network address (e.g., email address "P1@AA.com") of the subscriber "P1" in response to a prompt by the account management service executed in the secure network services 76 of the network operating system 56; the account management service executed in the secure network services 76 on the physical network device 88f can respond in operation 100 to reception of the external network address (e.g., email address "P1@AA.com") by causing the secure network services 76 to generate in operation 102 a unique private key "prvKeyP1_A1" and a public key "KeyP1_A1" for the user "P1" on the new device "A1" 12, and generate and send in operation 104 the registration request (containing the secure public key "KeyP1_A1") 106b to the prescribed destination (e.g., "registerme@whitestar.io") 108 associated with the secure peer-to-peer data network 5.

As described previously, receipt of the registration request 106b causes a physical network device (e.g., 88c or 88d) executing the distributed search (DS) agent 82 in the secure per-to-peer data network 5 to execute fraud control in operation 110, for example based on determining an inordinate number of registration requests 106. The distributed search (DS) agent 82, having received the registration request, can limit the scope of searching the external network address (e.g., the email address) to prevent the MCP device 14 from obtaining the external network address "in the clear", and can generate and send in operation 112 a validation response 114b to the external network address (e.g., email address "P1@AA.com") of the subscriber "P1", where the validation response can include the secure public key "KeyP1_A1" generated by the secure network services 76 on the new device "A1" 12.

The subscriber "P1" in operation 116 can receive the validation response 114b that specifies instructions (e.g., QR code, URL, text string, etc.) for submitting the included secure public key "KeyP1_A1" for validation. In response to the secure network services 76 executed on the new device "A1" 12 verifying in operation 118 the secure public key "KeyP1_A1" in the validation response 114b, the secure network services 76 executed on the new device "A1" 12 can (temporarily) auto-generate in operation 120 a federation ID "FA1" 18 that is allocated to the external network address (e.g., email address "P1@AA.com") used by the subscriber "P1", establishing a secure relationship between the external network address (e.g., email address "P1@AA.com") and the endpoint device "A1" 12. The network operating system 56 executed in the endpoint device "A1" 12 also can respond to verifying the secure public key "KeyP1_A1" in the validation response 114b by prompting the subscriber "P1" in operation 120 to create a new password for entry into the secure data network 5 via the new device "A1" 12, and by auto-generating (crypto-generating) in operation 120 an endpoint ID 20 for the endpoint device "A1" 12 that is a 128 bit UUID (e.g., "EID_A1" in FIG. 5A; "E2" in FIG. 2).

Hence, the network operating system 56 executed in the endpoint device "A1" 12 can store in the memory circuit 94 of the endpoint device "A1" 12 the federation object 32 that comprises the endpoint object 22 specifying the federation ID "FA1" 18 and having an endpoint ID (e.g., "EID_A1" in FIG. 5A) 20 that uniquely identifies the endpoint device "A1" 12 in the secure private core network 10. The federation object 32 stored in the endpoint device "A1" 12 identifies the federation ID "FA1" 18 within the secure private core network 10.

The network operating system 56 executed in the endpoint device "A1" 12 also can generate in operation 122 a cryptographic nonreversible hash of the external network address (e.g., the email address "P1@AA.com"), e.g., "HASH[P1@AA.com]", connect in operation 124 to the MCP device 14 (e.g., via an IP address that is made available to the network operating system executed in the endpoint device "A1" 12), and supply in operation 124 a registration message 126b.

The registration message 126b generated by the endpoint device "A1" 12 in operation 124 can specify the cryptographic nonreversible hash "HASH[P1 @AA.com]", its federation ID "FA1" 18, and its endpoint ID "EID_A1" that is owned by the federation ID "FA1" (e.g., "HASH[P1@AA.com]→FA1" and "FA1→['EID_A1']") (the network operating system 56 executed in the endpoint device "A" 12 also can include its public key "KeyP1_A1"). The network operating system 56 executed in the endpoint device "A1" 12 in operation 124 also can add to the registration message 126b one or more network addresses used for communications via an underlying data network 96 used as a multi-hop transport layer (60 of FIG. 3).

The MCP device 14 can respond to reception of the registration message from the endpoint device "A1" 12 in operation 128 of FIG. 5B by causing its distributed search (DS) agent 82 to execute in operation 130 a projection search on the supplied identifiers "HASH[P1@AA.com]", "FA1" and/or "EID_A1".

In response to determining a match on the cryptographic nonreversible hash "HASH[P1 @AA.com]", the distributed search (DS) agent 82 can cause the MCP device 14 to generate in operation 142 and output to the endpoint device "A1" 12 in operation 134 a secure endpoint acknowledgment 144 indicating another endpoint device "A" 12 exists in its federation 34; the acknowledgment generated in operation 142 also can include the signet of the endpoint device "A" 12 that is already a member of the same federation 34. The signet of the endpoint device "A" 12 can include: the secure public key "KeyP1_A" of the endpoint device "A" 12, an "alias" used by the endpoint device "A" 12, reachability information such as a list of one or more IP addresses usable by the endpoint device "A" 12, and the endpoint ID 20 of the endpoint device "A" 12.

As described previously, the MCP device 14 in operation 134 can encrypt the endpoint acknowledgment (containing the signet of the endpoint device "A" 12 and the secure public key "Key_MCP") with a temporal key, encrypt the temporal key with the secure public key "KeyP1_A1" of the endpoint device "A1" 12, and supply the encrypted temporal key in the secure endpoint acknowledgment 144 to the endpoint device "A1" 12. The supplied identifiers "HASH[P1@AA.com]", "F1" and "EID_A1" also can be supplied to the directory server 28 for subsequent projection searches in the secure private core network 10.

The encrypted temporal key in the secure endpoint acknowledgment 144 received by the endpoint device "A1" 12 in operation 138 enables the network operating system 56 executed in the endpoint device "A1" 12 in operation 140 to decrypt the temporal key, decrypt the acknowledgment, and obtain the secure public key "Key_MCP" of the MCP device 14.

The network operating system 56 executed in the endpoint device "A1" 12 can respond to the decrypted acknowledgment (specifying another endpoint is a member of the same federation 34, and that contains the signet for the endpoint device "A" 12) by initiating in operation 146 a prescribed secure salutation protocol with the endpoint device "A" 12. In particular, the secure network service 76 executed in the endpoint device "A1" 12 can generate and send, based on the received signet, a secure salutation request 148 identifying its endpoint ID "EID_A1" 20 and requesting a relationship with the endpoint device "A" 12; the salutation request can be encrypted using the secure public key "KeyP1_A" of the endpoint device "A" 12, and can include the alias (associated with the secure public key "KeyP1_A"), and also can include the secure public key "KeyP1_A1" of the endpoint device "A1" 12.

The endpoint device "A" 12 can "automatically" respond back with the endpoint device "A1" 12, for example the network operating system 56 executed in the endpoint device "A1" 12 can infer that the endpoint device "A" 12 and the endpoint device "A1" 12 are in the same federation based on a determined match of the hashed external network addresses (e.g., email addresses: for example, a search by a distributed search (DS) agent 82 on a hash of the email address can return the endpoint IDs for both the endpoint device "A" 12 and the endpoint device "A1" 12.

Hence, the network operating system 56 executed in the endpoint device "A" 12 can respond to the salutation request by sending a secure salutation reply (e.g., a salutation acceptance) 150 that includes the endpoint object 22 of the endpoint device "A" 12: the salutation reply 150 can be encrypted as described above using a temporal key that is further encrypted using the secure public key "KeyP1_A1", for formation of a secure salutation reply (e.g., secure salutation acceptance).

Hence, the network operating system 56 executed in the endpoint device "A1" 12 can determine from the endpoint object 22 of the endpoint device "A" 12 specified in the secure salutation reply 150 received in operation 152 that the endpoint object 22 specifies a federation ID "F1" 18: the federation ID "F1" 18 in the endpoint object 22 in the salutation acceptance 150 causes the network operating system 56 in the endpoint device "A1" 12 in operation 152 to determine that the endpoint device "A" 12 pre-existed in the secure private core network 10; hence, the network operating system 56 in the endpoint device "A1" 12 can establish a two-way trusted relationship with the endpoint device "A" 12 based on exchange of the public keys "KeyP1_A" and "KeyP1_A1", and in response re-associate its federation ID in operation 152 from "FA1" to "F1" in its endpoint object 20, and discard the initial federation ID "FA 1". Consequently, the network operating system 56 in the endpoint device "A1" 12 adopts the federation ID "F1" 18, thus establishing the identity of the owner of the devices "A" and "A1" as federation"F1" 34. Hence, the endpoint device "A1" 12 in its corresponding endpoint object 22 adopts the identity, user name, user image, etc. of the same user as in the endpoint device "A" 12 (as identified by its corresponding endpoint ID 20).

Hence, the secure private core network 10 can establish that the federation "F1" 32 owns the endpoint devices "A" and "A1" 12; moreover, a cohort is established between the endpoint devices "A" and "A1" 12 based on sharing cryptographic keys, such that any content created on one endpoint (e.g., endpoint device "A" 12) can be autonomically and securely replicated to the other endpoint (e.g., endpoint device "A1" 12) by the autonomic synchronizer 52. Since the synchronization process in the secure private core network 10 is aware of all the federations 34, any connection by an existing endpoint device 12 in a federation 34 to a new endpoint device 12 or a new federation 34 can cause autonomic replication of the connection to the other devices in the existing federation 34 or the new federation 34 by the associated autonomic synchronizer 52.

According to example embodiments, an identity management system ensures establishment of trusted two-way trusted relationships in a secure peer-to-peer data network based on ensuring each identity is verifiable and secure, including each federation identity that creates a verified association with an identified external network address used by a requesting party, and each endpoint identifier that is cryptographically generated and associated with a federation identity, enabling a federation identity to own numerous endpoint identifiers for aggregation of two-way trusted relationships in the secure peer-to-peer data network.

Crypto-Signed Switching and Anti-Reply Protection by Hashing Encrypted Temporal Key FIGS. 7-10 illustrate in further detail an example crypto-signed switching and anti-replay protection that can be implemented between two-way trusted network devices in the secure peer-to-peer data network 5, according to an example embodiment. A particular feature of the example embodiments includes a source network device (e.g., an endpoint device "A" 12) generating a secure data packet (e.g., 158 of FIG. 8) based on dynamically generating a unique temporal key (e.g., "TK" 168 of FIG. 8) used for encrypting a data packet payload (e.g., 166 of FIG. 8) into an encrypted payload (e.g., 204 of FIG. 8), and encrypting the unique temporal key 168 into an encrypted temporal key (e.g., "ENC(Key_B)[TL]" 178 of FIG. 8) using a secure public key (e.g., "Key_B" 198 of FIG. 8) of a destination device (e.g., endpoint device "B" 12) identified within a destination address field (e.g., "DEST=B"). In other words, the source endpoint device dynamically generates a new temporal (e.g., time-based) key "TK" 168 for each secure data packet 158 to be transmitted, ensuring no temporal key 168 is ever reused; moreover, the encrypted temporal key 178 ensures that only the destination device can decrypt the encrypted temporal key 178 to recover the temporal key 168 used to encrypt the payload 166.

The encrypted temporal key 178 not only ensures that the destination device (e.g., endpoint device "B" 12) is the only network device in the secure peer-to-peer data network 5 that can decrypt the encrypted payload 204: the encrypted temporal key 178 also provides for the secure data packet 174 a cryptographically-unique encrypted bitstring, also referred to herein as a "nonce" (or "nounce"), that enables any physical network device 88 receiving the secure data packet 158 to verify the secure data packet 158 is not a copy of a prior transmitted data packet (indicating a replay attack).

Figure 10:
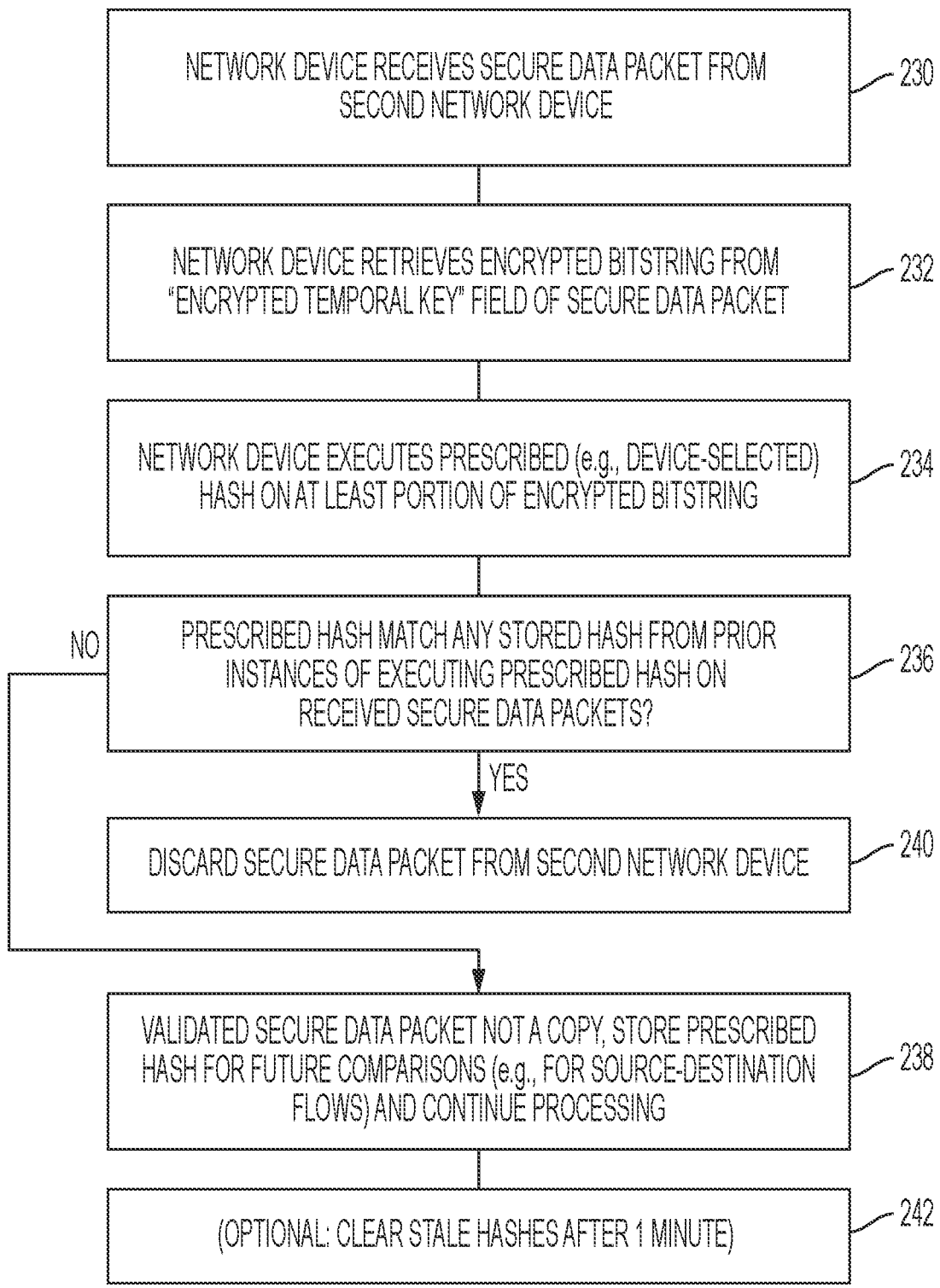
FIG. 10 illustrates in further detail a method of validating a secure data packet based on executing a prescribed hash of at least a portion of an encrypted temporal key, and determining whether the secure data packet is not a copy based on a determined absence of a prior instance of the prescribed hash, according to an example embodiment.

Hence, as illustrated in FIG. 10, the processor circuit 92 of any physical network device 88 can respond to receiving in operation 230 a secure data packet 158 (or a secure forwarded data packet 164 of FIG. 8) by retrieving in operation 232 an encrypted bitstring from the "encrypted temporal key field" 178, and executing in operation 234 its own prescribed hash (e.g., using its own unique hash parameters) to generate a hashed value of at least a portion of the encrypted bitstring (corresponding to the encrypted temporal key 178). The processor circuit 92 of a physical network device 88 in operation 236 can compare the hashed value with other stored hash values (e.g., previously stored in operation 238 in a data structure within its memory circuit 94) to determine whether the hashed value equals a prior instance of a hashed value stored by the physical network device 88 for a prescribed time interval (e.g., one minute).

It is mathematically impossible for hashes of different encrypted temporal keys 178 to have an identical hash value unless the data packet 158 (or 164) is copied: hence, the processor circuit 92 of any physical network device 88 can determine in operation 238 that the secure data packet 158 (or 164) is not a copy based on a determined absence of a prior instance of the prescribed hash, and can continue processing the secure data packet 158, including storing the prescribed hash for future comparisons in operation 236 for subsequently-received secure data packets 158 or 164, for example for a corresponding identified source-destination flow.

Conversely, any physical network device 88 in operation 240 can discard (i.e., "drop") the secure data packet 158 (or 164) in response to determining the prescribed hash from the received secure data packet 158 matches a prior instance of the prescribed hash on a previously-received secure data packet 158, indicating the secure data packet received in operation 230 is a copy of a previously-received data packet.

Hence, any physical network device 88 can implement anti-replay protection with minimal expenditure of processing resources based on determining in operation 236 whether it has a copy of a prior instance of a prescribed hash on an encrypted bitstring, where the encrypted bitstring is located within a data packet field corresponding to an encrypted temporal key in a received secure data packet. The stored hashes can be deleted or "cleared" in operation 242 in response to determining the stored hashes are "stale", for example after a prescribed time interval following termination of an identified data flow between a source device and a destination device.

The example embodiment described herein enables endpoint devices (e.g., "A" and "B") 12 in the secure peer-to-peer data network 5 to utilize secure communications of encrypted secure data packets 158 via one or more replicator devices 16 overlying an external data network 96. Moreover, the example embodiment enables secure communications of secure forwarded packets 164 between endpoint devices (e.g., "A" and "B") 12, even if the secure peer-to-peer data network 5 utilizes the external data network 96 where each endpoint device 12 can be physically located in a wireless local area network that is secured by a security appliance (e.g., a firewall device) 152, and replicator devices 16 forward secure forwarded packets 164 via the external data network 96.

The example embodiments also are particularly effective in cases where actual deployment is via an existing IP network infrastructure 96, for example where the endpoint device "A" is connected within a first private (e.g., "home 1") IP network secured by a first firewall device "FW1" 152, and the second endpoint device "B" is connected within a second private (e.g., "home 2") IP network secured by a second firewall device "FW2" 152. Conventional deployments in an IP-based network (e.g., via the Internet) could encounter a situation where an endpoint device "A" could transmit data packets beyond the first firewall "FW1" 152 but not receive packets via the first firewall "FW1" 152; similarly, the endpoint device "B" in a conventional deployment could transmit data packets beyond the second firewall "FW2" 152 but not receive packets via the second firewall "FW2" 152. Hence, reliance on conventional deployments could result in a scenario where the endpoint devices "A" and "B" could not establish a logical peer-to-peer connection due to the traffic blocking by the first and second firewalls 152.

According to example embodiments, the endpoint devices "A" and "B" can dynamically establish a secure virtualized peer-to-peer connection, using crypto-switching via the pairwise topology 98 in the secure private core network 10, in a manner that maintains security and trust and while maintaining secrecy of the data traffic as it traverses through the secure private core network 10 via the underlying external data network 96; in other words, the crypto-switching via the pairwise topology 98 ensures that no core component (e.g., replicator device 16 or the MCP device 14) is capable of detecting the contents of any payload transmitted by endpoint devices "A" or "B".

As described below, the example embodiment can establish within one or more replicator devices 16 a flow table entry 154 that maintains a flow state for reaching a destination endpoint device via an identified trusted peer replicator device 16; each replicator device 16 also can establish a forwarding information base (FIB) entry 156 that enables the replicator device 16 to reach each trusted peer replicator device 16 and each connected endpoint device 12.

Figure 7:
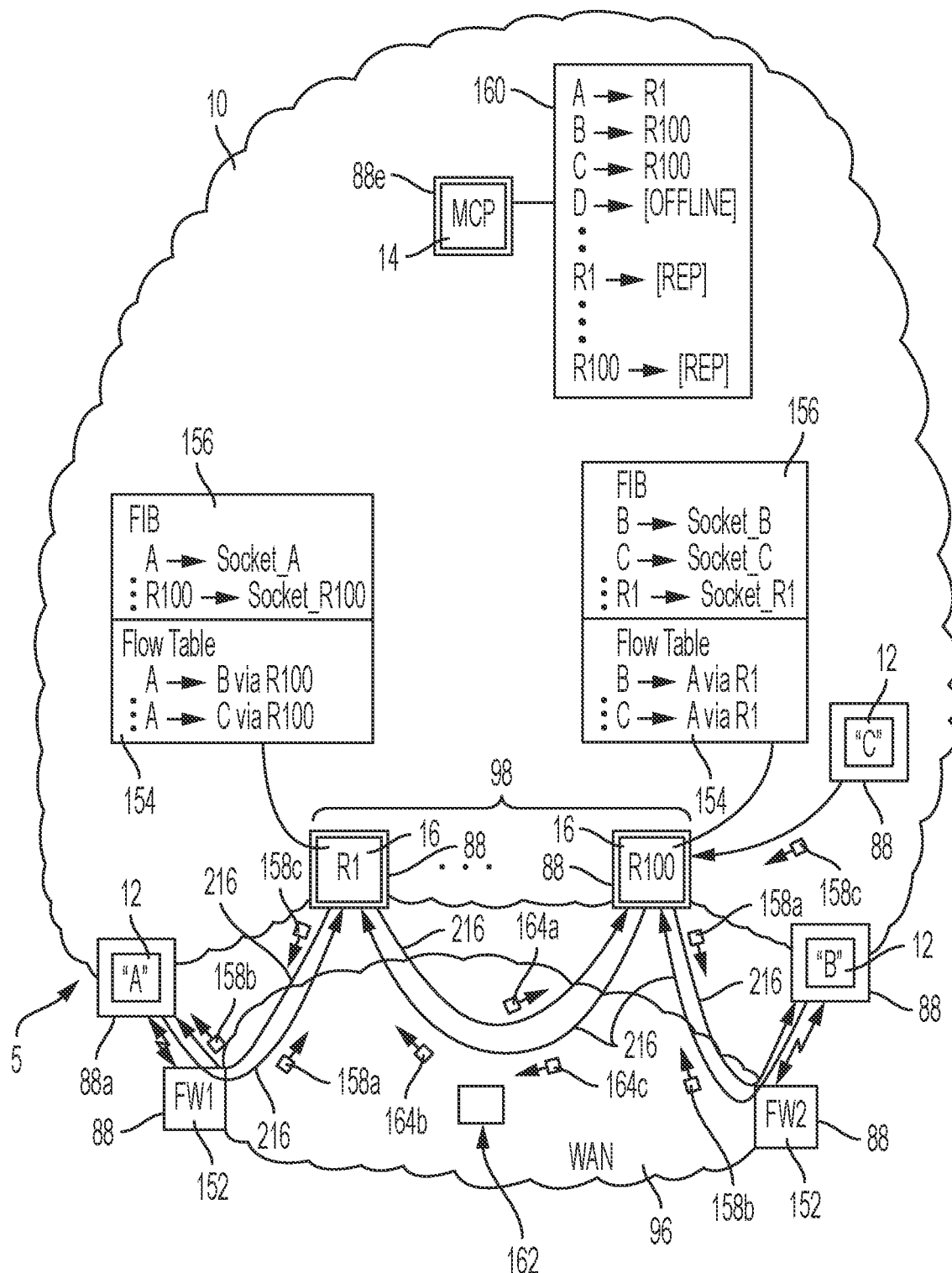
FIG. 7 illustrates crypto-signed switching between two-way trusted network devices in a secure peer-to-peer data network, according to an example embodiment.
Figure 8:
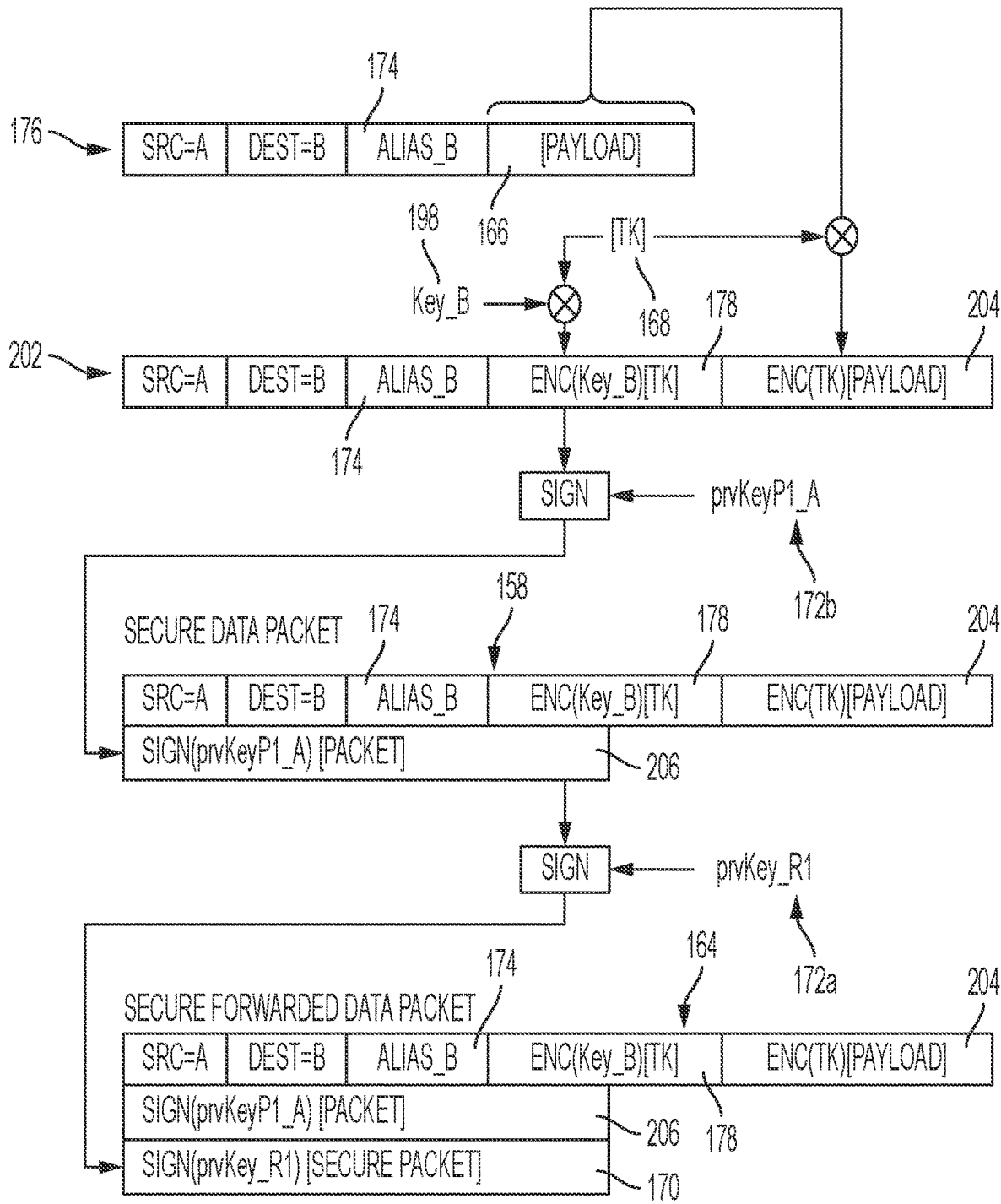
FIG. 8 illustrates crypto-signed switching based on generation of a secure data packet by an endpoint device, and generation of a secure forwarded packet by a first replicator device for secure transmission to a second replicator device and packet verification based on comparing hashes of encrypted temporal keys, according to an example embodiment.

Hence, the example embodiment enables secure communications to reach endpoint devices 12 located "behind" a security appliance 152, since the endpoint device (e.g., "A") 12 can execute the prescribed secure salutation protocol with the identified replicator device 16, causing the associated secure appliance (e.g., "FW1") 152 to create a state entry that identifies the replicator device (e.g., "R1") 16, for example based on the IP address of the replicator device (e.g., "R1") 16 that is specified in the destination address field of a secure data packet (e.g., 158a of FIGS. 7 and 8). The state entry created by the security appliance 152 also can be updated in response to the endpoint device "A" 12 to sending a secure data packet (e.g., 158a) to its replicator device (e.g., "R1") 16; hence, the state entry created by the secure appliance (e.g., "FW1") 152 enables the replicator device (e.g., "R1") 16 to send a second secure data packet (e.g., 158b) back to the endpoint device (e.g., "A") 12 via the secure appliance (e.g., "FW1") 152.

As described in further detail below, the crypto-signed switching described herein is based on the MCP device 14, as the prescribed management agent in the secure peer-to-peer data network 5, tracking a connection status 160 of every network device in the secure peer-to-peer data network 5, including each endpoint device 12 and each replicator device 16. The MCP device 14 establishes a pairwise topology (e.g., a mesh) 98 of two-way trusted replicator devices 16 based on causing each replicator device 16, during registration with the MCP device 16, to execute a prescribed secure salutation protocol with each and every other replicator device 16 in the secure private core network. The MCP device 14 also causes each endpoint device 12, during registration with the MCP device 16 (or in response to the endpoint device 12 returning from an "offline state" to an "online" state), to establish a two-way trusted relationship with an identified replicator device (selected by the MCP device 16) based on executing a prescribed secure salutation protocol with the identified replicator device 16. The MCP device 14 also can identify, for a requesting replicator device (e.g., "R1") 16, a peer trusted replicator device (e.g., "R100") 16 for reaching a destination endpoint device (e.g., "B").

The crypto-signed switching also is based on a replicator device (e.g., "R1") 16 creating, based on instructions from the MCP device 14, two-way trusted relationships with each of the available replicator devices 16 for formation of the pairwise topology 98 of two-way trusted replicator devices 16; the replicator device (e.g., "R1") 16 can establish a two-way trusted relationship with one or more endpoint devices (e.g., "A") 14 according to the prescribed secure salutation protocol. The replicator device (e.g., "R1") 16 can determine, from the MCP device 16, a trusted peer replicator device (e.g., "R100") for reaching a destination endpoint device (e.g., "B") 12 in response to validating a secure data packet (e.g., 158a) received from a connected source endpoint device (e.g., "A").

As described in further detail below with respect to FIGS. 8-10, the replicator device (e.g., "R1") 16 also can cryptographically sign the secure data packet (e.g., 158a) to generate a replicator signature 170 for secure transmission to its trusted peer replicator device 16 as a secure forwarded packet (e.g., 164a) containing the secure data packet (e.g., 158a) and the replicator signature 170, ensuring no network node 162 in the underlying external data network 96 can decrypt the secure data packet (e.g., 158a) contained in the secure forwarded packet (e.g., 164a).

Similarly, a replicator device (e.g., "R100") 16 receiving a cryptographically-signed secure forwarded packet (e.g., 164a) from a trusted peer replicator device (e.g., "R1") 16 can execute validation of the secure forwarded packet (e.g., 164a) as having been received from a trusted peer replicator device 16, verifying the secure forwarded packet is not a replay attack, and verifying the replicator signature 170 in the secure forwarded packet.

The replicator device (e.g., "R100") can respond to successful validation of the secure forwarded packet (containing the secure data packet 158a) by forwarding the secure data packet (e.g., 158a) to its attached destination endpoint device (e.g., "B") 12, maintaining the cryptographic security of the secure data packet (e.g., 158a) for decryption by the attached destination endpoint device "B" 12 following validation of the secure data packet (e.g., 158a). Similar operations can be executed "in reverse" that enable the endpoint device "B" 12 to generate and send a second secure data packet 158b to the endpoint device "A" 12 via its replicator device "R100" 16; similarly, an endpoint device "C" 12 can send a secure data packet 158c to the endpoint device "A" 12 via the replicator device "R100" 16, which can securely forward to the replicator device "R1" a secure data packet 158c in a secure forwarded data packet 164c that is cryptographically signed by the replicator device "R100" with its secure private key "prvKey_R100" to generate a corresponding replicator signature.

Hence, the example embodiments establish a two-way trusted relationship along each hop of a secure data packet 158 from a source endpoint device to a destination endpoint device; the example embodiments also provide a unique replicator signature in order to secure a data packet along each hop of the data packet, maintaining pairwise security between replicator devices 16 along each hop. As described below, the example embodiments also provide a unique hash key along each hop to validate there are no replay attack attempts.

The example embodiments also are scalable: the example embodiments can be deployed to enable a billion ($10^9$) users with a billion ($10^9$) endpoint devices 12 to have connectivity within the secure private core network 10, enabling connectivity to a quintillion ($10^{18}$) endpoint devices using one hundred replicator devices 16.

Figure 9A:
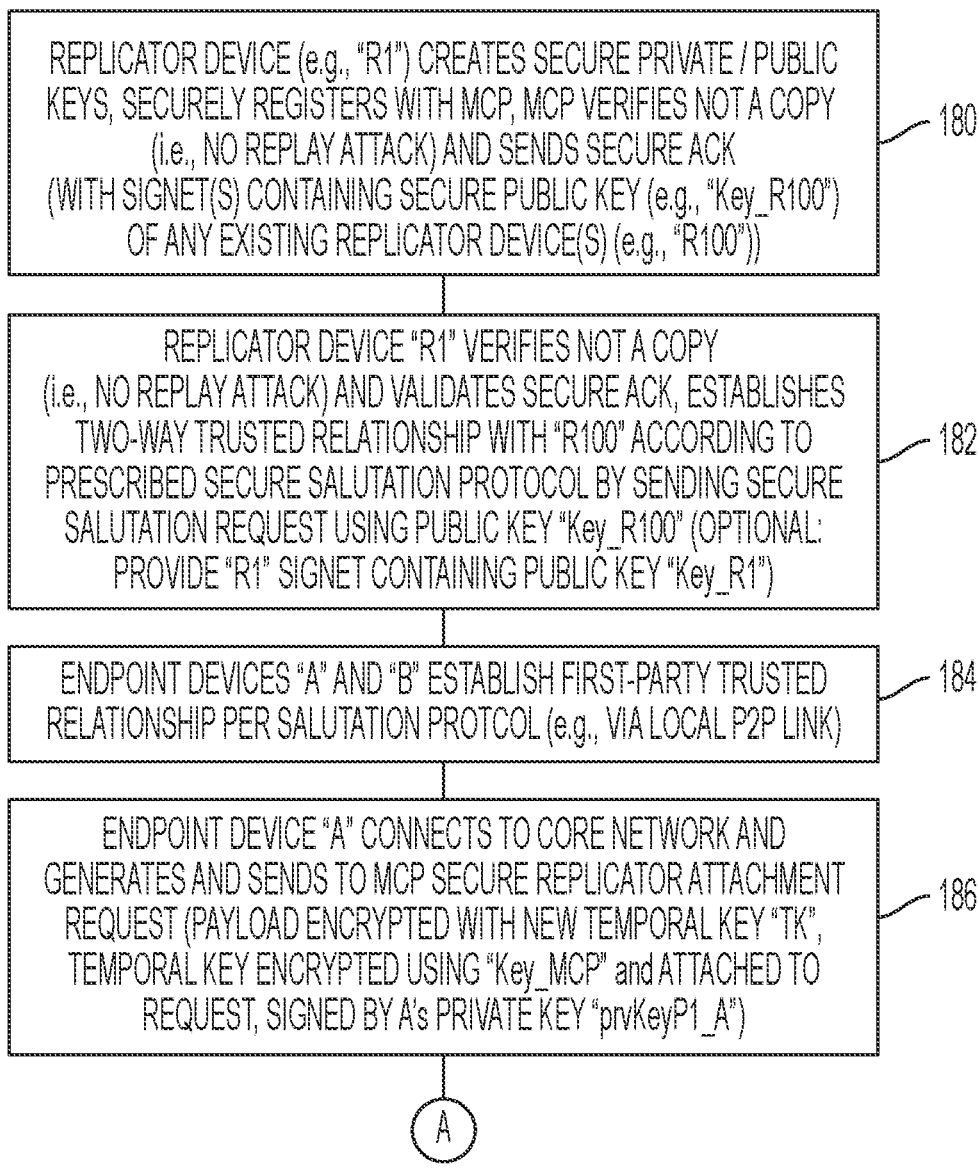
FIGS. 9A-9E summarize a method of executing crypto-signed switching and packet verification based on comparing hashes of encrypted temporal keys, according to an example embodiment.

Referring to FIG. 9A, the replicator device "R1" 16 in operation 180 upon joining the secure private core network 10 can generate for itself a secure private key "prvKey_R1" (172a of FIG. 8) and a corresponding public key "Key_R1".

The replicator device "R1" 16 in operation 180 can securely register with the MCP device 14 as described above with respect to FIGS. 5A-5B.

The processor circuit 92 of the physical network device 88e executing the MCP device 14 in operation 180 can update a table of connection status entries 160 of all endpoint devices 12 registered with the secure private core network 10; the table also can store connection status entries 160 for registered replicator devices 16. Each connection status entry 160 for an endpoint device 12 can specify a corresponding next-hop replicator identifier (if available) for each corresponding endpoint device 12, or an "offline" state indicating the endpoint device 12 is not reachable in the secure data network 5. The endpoint state table 160 enables the MCP device 14 to identify in operation 180 a replicator device 16 that an endpoint device 12 should connect to (e.g., based on load balancing, locality, etc.). As described below, the connection status entries 160 enables the MCP device 14 to identify a "next hop" replicator device for reaching a destination endpoint device 12. Since the MCP device 14 is attached to every replicator device 16, each replicator device 16 has a corresponding connection status entry 160.

Hence, the MCP device 14 in operation 180 can respond to the secure registration of the replicator device 16 by executing anti-replay verification based on verifying that the received secure registration is not a copy of a previously-received secure data packet as described previously with respect to FIG. 10, and sending a secure acknowledgment: the secure acknowledgment can contain one or more signets containing secure public keys of existing replicator devices (e.g., "R100"), causing the replicator device "R1" in operation 182 to establish a pairwise topology of a two-way trusted relationship with at least the replicator device "R100" 16 using its corresponding signet containing its corresponding public key "Key_R100".

In particular, the processor circuit 92 of the physical network device 88 executing the replicator device "R1" 16 in operation 182 can validate the secure acknowledgment as described herein, including executing anti-replay verification based on verifying that the received secure acknowledgment is not a copy of a previously-received secure data packet as described previously with respect to FIG. 10. The replicator device "R1" 16 can establish a two-way trusted relationship with the replicator device "R100" 16 according to the prescribed secure salutation protocol by sending a secure salutation request using the public key "Key_R100" (as described in operation 146 of FIG. 5B); the replicator device "R1" 16 also can include in the secure salutation request its signet containing its public key "Key_R1". The replicator device "R100" 16 in response can either automatically accept the secure salutation request (based on decrypting using its private key "prvKey_R100"), alternately the replicator device "R100" 16 can verify with the MCP device 14 that the replicator device "R1" 16 is a trusted replicator device, and in response generate and send to the replicator device "R1" 16 a secure salutation reply for establishment in operation 182 of the two-way trusted relationship between the replicator device "R1" 16 and the replicator device "R100" 16.

The replicator device "R1" 16 can repeat in operation 182 the establishing of a two-way trusted relationship with each and every available replicator device 16, based on a corresponding signet received from the MCP device 14.

The endpoint device "A" 12 in operation 184 can establish a first-party two-way trusted relationship with the endpoint device "B" 12, for example based on executing the prescribed secure salutation protocol via a peer-to-peer connection that can be established while the endpoint devices "A" and "B" 12 are in local proximity to each other (e.g., within the same wireless local area network). The endpoint device "A" 12 as an alternative also can establish a first-party two-way trusted relationship with a replicator device (e.g., "R1") 16 in operations 186 through 194, and in response execute the prescribed secure salutation protocol with the endpoint device "B"12 via the crypto-signed switching executed by the replicator devices "R1" and "R100", described below. Hence, an endpoint device (e.g., "A") 12 can execute the prescribed secure salutation protocol with another endpoint device 12 via a secure P2P data link and/or via one or more replicator devices 16. As described previously with respect to FIGS. 1 and 2, the establishment of a two-way trusted relationship between the endpoint devices "A" and "B" enables autonomic synchronization of message objects (36 of FIG. 2) that are referenced within conversation objects (42 of FIG. 2) that identify federation subscribers of the endpoint devices "A" or "B" 12. As apparent from the foregoing, however, the autonomic synchronization requires that the endpoint devices "A" or "12" can reach each other, either via a secure P2P data link or via the secure private core network 10.

According to example embodiments, the endpoint device "A" 12 in operation 186 can connect to the secure private core network 10 based on generating and sending a secure replicator attachment request to the MCP device 14 via a prescribed IP address utilized for reaching the MCP device 14 via the external data network 96 (60 in FIG. 3). The secure replicator attachment request ("RQ_A") (illustrated generally by 158 of FIG. 8) is generated by the endpoint device "A" 12 based on generating a replicator attachment request (illustrated generally by 176 of FIG. 8), generating a new temporal key "TK" (168 of FIG. 8) used for encrypting the replicator attachment request 176, encrypting the temporal key 168 using the MCP public key (illustrated generally by 198 of FIG. 8) and attaching the encrypted temporal key (illustrated generally by 178 in FIG. 8) to the encrypted replicator attachment request 176, and digitally signing the packet (containing the encrypted replicator attachment request and encrypted temporal public key 178) using endpoint device A's private key "prvKeyP1_A" (172b of FIG. 8). The secure replicator attachment request also can specify a source address of the endpoint device "A", the destination address of the MCP, and an "Alias identifier" that corresponds to the MCP public key used to encrypt the temporal key.

Figure 9B:
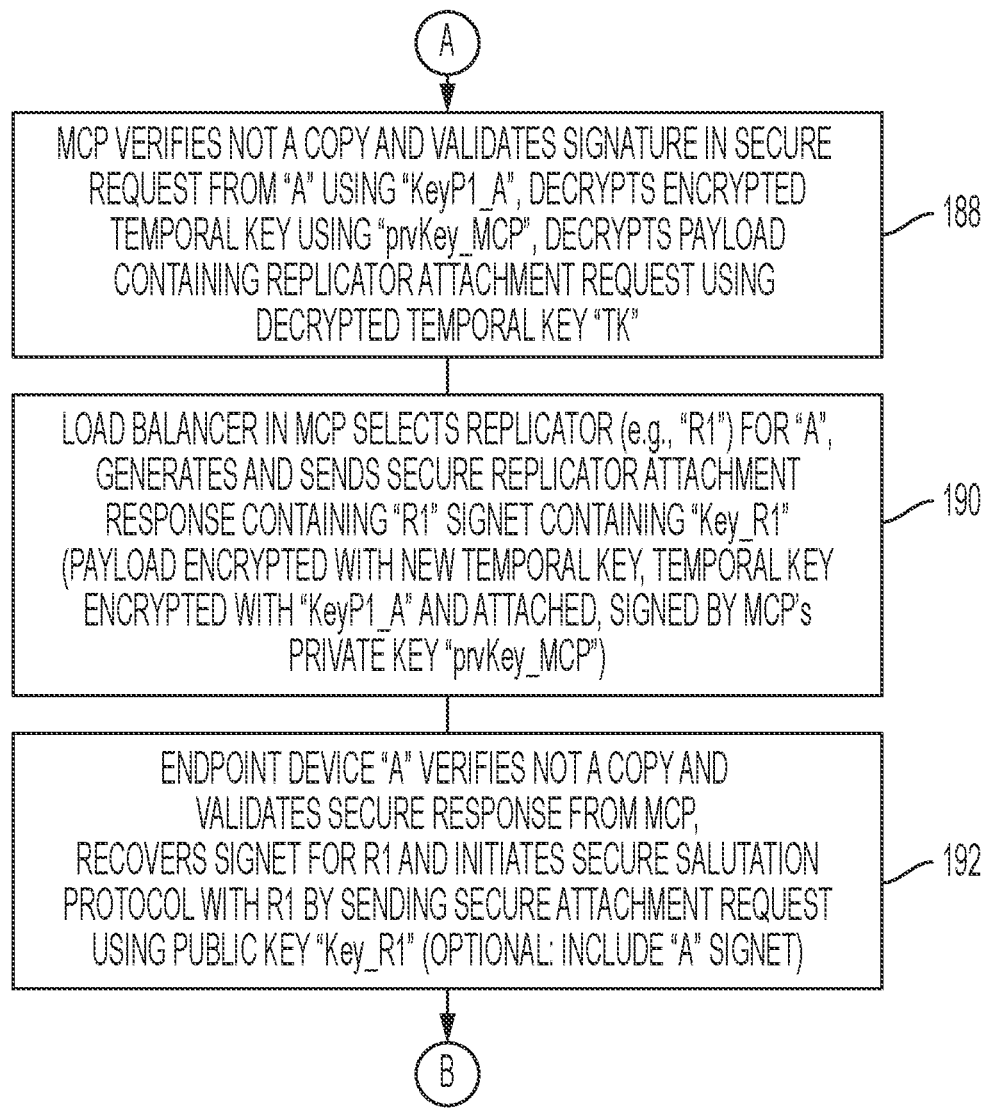

Referring to FIG. 9B, the MCP device 14 in operation 188 can execute anti-replay verification based on verifying that the received secure replicator attachment request is not a copy of a previously-received secure data packet as described previously with respect to FIG. 10. The MCP device 14 also can digitally verify in operation 188 the signature of the secure replicator attachment request "RQ_A" (using its stored copy of endpoint device A's public key "KeyP1_A"), and in response the MCP device 14 can decrypt the replicator attachment request using the MCP private key (and the decrypted temporal key); the MCP device 14 can respond to the replicator attachment request following decryption by causing the load balancer (62 of FIG. 1) executed in the MCP device 14 to execute in operation 190 a discovery process that assigns each endpoint device 12 an attachment to a replicator device 16 in the secure private core network 10.

In response to the load balancer 62 in operation 190 identifying the replicator device "R1" 16 for allocation to the endpoint device "A", the MCP device 14 can generate in operation 190 a secure replicator attachment response based on generating a replicator attachment response that includes the signet of the replicator device "R1" 16: as described previously, the signet of the replicator device "R1" 16 can include the secure public key "Key_R1" of the replicator device "R1" 16, a corresponding alias to be used by the replicator device "R1" 16 to identify the public key "Key_R1" that is in use, reachability information such as a list of one or more IP addresses usable by the replicator device "R1" 16, and a replicator ID 20 of the endpoint device replicator device "R1" 16.

The replicator attachment response (including the signet of the replicator device "R1" 16) can be secured based on the MCP device 14 generating in operation 190 a new temporal key "TK" (168 of FIG. 8) used for encrypting the replicator attachment response (illustrated generally by 176 in FIG. 8), encrypting the temporal key using the endpoint device A's public key "KeyP1_A", attaching the encrypted temporal key (illustrated generally by 178 in FIG. 8) to the encrypted replicator attachment response, and digitally signing the packet (containing the encrypted replicator attachment response and encrypted temporal public key) using the MCP private key "prvKey_MCP". The secure replicator attachment response also can specify a source address of the MCP device 14, the destination address of the endpoint device "A", and an "Alias identifier" that corresponds to the public key "KeyP1_A" used to encrypt the temporal key.

The endpoint device "A" 12 can respond in operation 192 to reception of the secure replicator attachment response by executing anti-replay verification based on verifying that the received secure replicator attachment request is not a copy of a previously-received secure data packet as described previously with respect to FIG. 10. The endpoint device "A" also can digitally verify the signature of the secure replicator attachment response (using its stored copy of the MCP device public key "Key_MCP"); the endpoint device "A" 12 also can decrypt the secure replicator attachment response using its private key "prvKeyP1_A" to decrypt the temporal key, to recover the signet for the replicator device "R1" 16. As indicated previously, the signet of the replicator device "R1" 16 can include: the secure public key "Key_R1" of the replicator device "R1" 16, an "alias" used by the replicator device "R1" 16, reachability information such as a list of one or more IP addresses usable by the replicator device "R1" 16, and the endpoint ID 20 of the replicator device "R1" 16.

The endpoint device "A" 12 can respond to reception of the signet for the replicator device "R1" 16 by generating and sending in operation 192 a secure attachment request to the replicator device "R1" 16 according to the prescribed secure salutation protocol (secured as described above including an encrypted temporal key and signing of the salutation request by the private key "prvKeyP1_A"). The secure attachment request can be encrypted using the secure public key "Key_R1" of the replicator device "R1" 16, and can include the alias (associated with the secure public key "Key_R1"), and also can include the signet (containing the secure public key "KeyP1_A") of the endpoint device "A" 12.

Figure 9C:
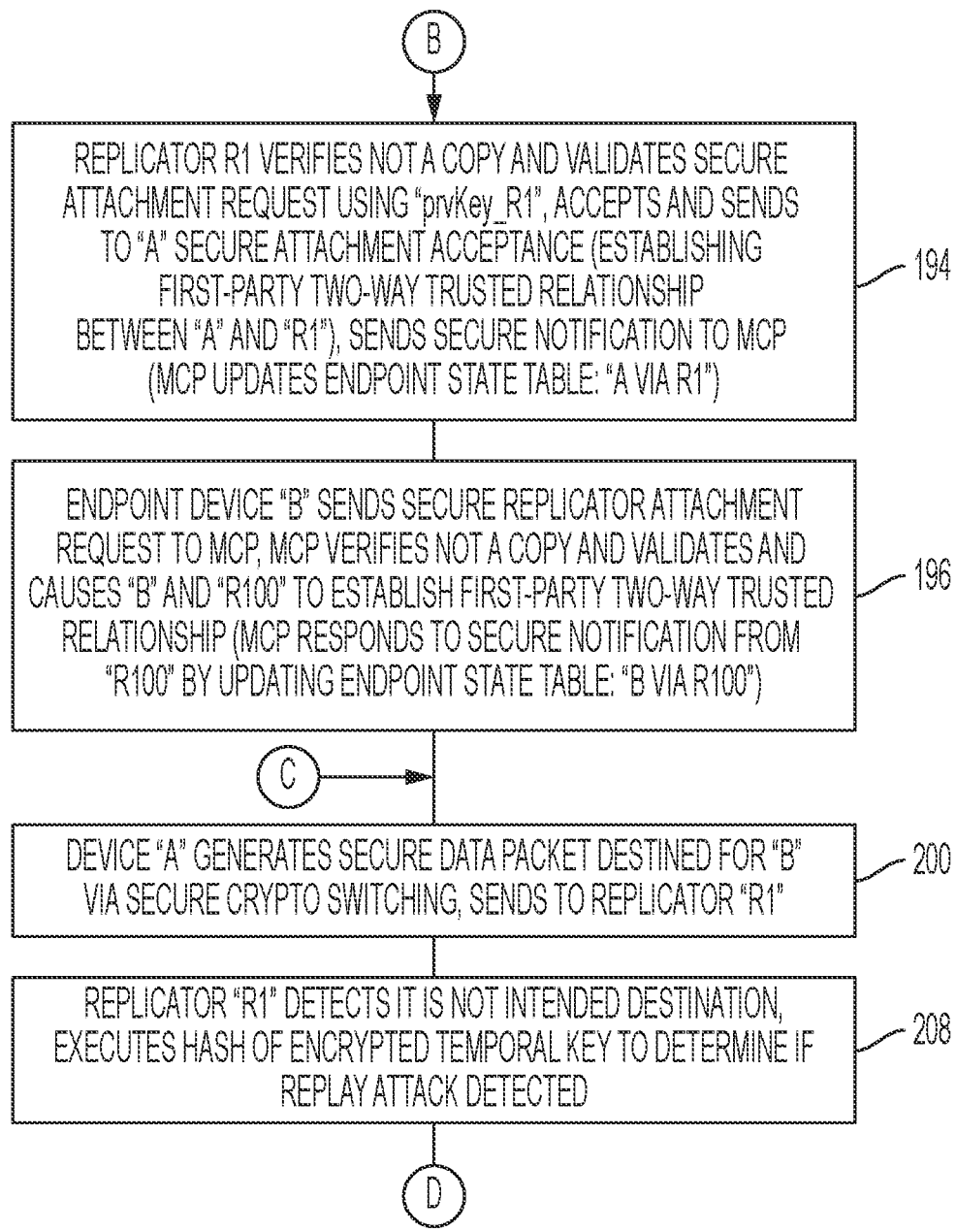

Referring to FIG. 9C, the processor circuit 92 of the physical network device 88 executing the replicator device "R1" 16 in operation 194 can respond to the secure attachment request by executing anti-replay verification based on verifying that the received secure replicator attachment request is not a copy of a previously-received secure data packet as described previously with respect to FIG. 10; the replicator device "R1" 16 also can respond to successful anti-replay verification by validating the secure attachment request according to the prescribed secure salutation protocol, enabling the replicator device "R1" 16 to form a first party trust relationship with the endpoint device "A" based on sending a secure attachment acceptance that can include a corresponding endpoint object 22 that identifies the replicator device "R1" 16. The replicator device "R1" 16 in operation 194 can send a secure notification to the MCP device 14 indicating that the endpoint device "A" 12 has attached to the replicator device "R1" 16, causing the MCP device 14 (following anti-replay verification as described above) to update the corresponding connection status entry 160 of the endpoint device "A" 12 as attached to a next-hop replicator device "R1" 16.

Hence the endpoint device "A" 12 in operation 194 can establish a first-party two-way trusted relationship with the next-hop replicator device "R1" 16 based on creating (as a local data structure) a key pair association of its private key and the peer public key{"prvKeyP1_A", "Key_R1"} for securely sending data packets destined for the next-hop replicator device "R1" 16 and securely receiving data packets originated by the replicator device "R1" 16. Similarly, the replicator device "R1" 16 can establish the first-party two-way trusted relationship with the attached endpoint device "A" 12 based on creating (as a local data structure) a key pair association of {"prvKey_R1", "KeyP1_A"} for securely sending data packets destined for the attached endpoint device "A" 121 and securely receiving data packets originated by the attached endpoint device "A" 121.

Similarly, the endpoint device "B" 12 (and/or "C" 12) in operation 196 can send to the MCP device 14 a secure replicator attachment request that causes the MCP device 14 to allocate the replicator device "R100" 16 for attachment by the endpoint device "B" 12 (and/or "C" 12) by generating and sending back to the endpoint device "B" 12 (and/or "C" 12) a secure replicator attachment reply. The endpoint device "B" 12 (and/or "C" 12) can decrypt and recover the signet for the replicator device "R100" 16, and send to the replicator device "R100" 16 a secure attachment request for establishment of a first-party two-way trusted relationship with the replicator device "R100" 16. The replicator device "R100" 16 can respond to the secure attachment request from the endpoint device "B" 12 (and/or "C" 12) by generating and sending to the MCP device 14 a secure notification that the endpoint device "B" 12 (and/or "C" 12) has attached to the replicator device "R100" 16.

As described previously, each replicator device 16 establishes a first-party two-way trusted relationship with every other replicator device 16 according to the prescribed secure salutation protocol. As apparent from the foregoing, each hop from a source endpoint device (e.g., "A") 12 and a destination endpoint device (e.g., "B") 12 is via peer devices having established a first-party two-way trusted relationship. Hence, any two endpoint devices (e.g., "A" and "B") 12 can have a secure path in the secure data network 5 of either zero hops via a replicator device (e.g., a connection between endpoint devices "A" and "A1" within a private-only data network such as a home network that is behind a firewall), one hop via a replicator device (e.g., between endpoint devices "B" and "C" via the replicator device "R100"), or two hops (e.g., between endpoint devices "A" and "B" via replicator devices "R1" and "R100"). The establishment of a secure path based on an aggregation of trusted peer connections enable the establishment of secure network communications in the secure data network 5 via the pair-wise topology 98, without any need for any additional security considerations at the application layer (58 of FIG. 3).

As described previously, the endpoint device "A" 12 can first establish a first-party two-way trusted relationship with a replicator device (e.g., "R1") 16 in operations 186 through 194, and in response execute the prescribed secure salutation protocol with the endpoint device "B"12 via the crypto-signed switching executed by the replicator devices "R1" and "R100", described below. For example, the endpoint device "A" 12 (of the federation "F1" 34) can respond to attaching to the replicator device "R1" 16 by sending to the replicator device "R1" 16 a secure query for reaching the owner of the federation "F2" 34, using for example a hash of an email address used by the owner of the federation "F2" 34 as described above; if needed, the replicator device "R1" 16 can execute a crypto-switching (described below) and forward a secure forwarded request to the MCP device 14. The MCP device 14 can respond to validation of the secure forwarded request (described below) by sending a secure response that contains the signet of the endpoint device "B", for example based on the DS agent 82 executed in the MCP device 16 determining, based on the corresponding connection status entry 160, that the federation "F2" 34 is reachable via the endpoint device "B" 12. Alternately, the replicator device "R1" can respond to the secure query from the endpoint device "A" 12 based on local availability of the signet for the endpoint device "B" 12. Hence, the replicator device "R1" 16 can forward the secure response to the endpoint device "A" 12, enabling the endpoint device "A" to execute the prescribed secure salutation protocol in response to receiving the corresponding signet of endpoint device "B" 12 via the replicator device "R1".

The endpoint device "A" 12 in operation 200 can generate a secure data packet 158a, illustrated in FIGS. 7 and 8, that is destined for the endpoint device "B" 12 and that specifies an alias ("ALIAS_B") 174 for the endpoint device "B" 12 (identified from B's signet obtained by the endpoint device "A" 12): the endpoint device "A" 12 can encrypt the payload 166 of the unencrypted data packet 176 using a dynamically-generated temporal key (TK) 168, encrypt the temporal key (TK) 168 using B's public key "Key_B" and add the encrypted temporal key "ENC(Key_B)[TK]" 178 to the data packet 202 that also contains the encrypted payload "ENC (TK)[PAYLOAD]" 204; the endpoint device "A" 12 also can digitally sign the data packet ("PACKET") 202 using the private key "prvKeyP1_A" 172b to generate a source endpoint signature 206, enabling other network devices in possession of the public key "KeyP1_A" to verify the secure data packet is from the endpoint device "A" 12. Hence, the secure data packet 158a cannot be decrypted by any device except the destination endpoint device "B" 12; consequently, the secure data packet 158 can secure the logical one-hop connection 216 between the endpoint device "A" 12 and the replicator device "R1" 16.

The endpoint device "A" 12 in operation 200 can transmit the secure data packet 158a to its replicator device "R1" 16. The replicator device "R1" 16 in operation 208 can respond to receiving the secure data packet 158a by detecting from the destination address field ("DEST=B") that it is not the intended destination; hence, the replicator device "R1" 16 can initiate in operation 208 validation operations to determine whether the received secure data packet can be trusted. Hence, the replicator device "R1" 16 can initiate validation operations based on first detecting whether the secure data packet is a replay, DoS or other form of cyber attack.

As described previously with respect to FIG. 10, the replicator device "R1" 16 can detect in operation 208 whether the secure data packet 158a is a replay attack based on executing a hash of the encrypted temporal key 178 in operation 234 of FIG. 10: if in operation 236 of FIG. 10 the replicator device "R1" 16 detects a match with a stored hashed encrypted temporal key from a previously-transmitted data packet, the replicator device "R1" 16 in operation 240 of FIG. 10 can discard (i.e., drop) the received secure data packet as a replay attack; if the replicator device "R1" 16 detects no match of the hashed encrypted temporal key, the replicator device "R1" 16 in operation 208 (238 of FIG. 10) can conclude there is no replay attack and store in operation 238 of FIG. 10 the hashed encrypted temporal key for future comparisons.

Figure 9D:
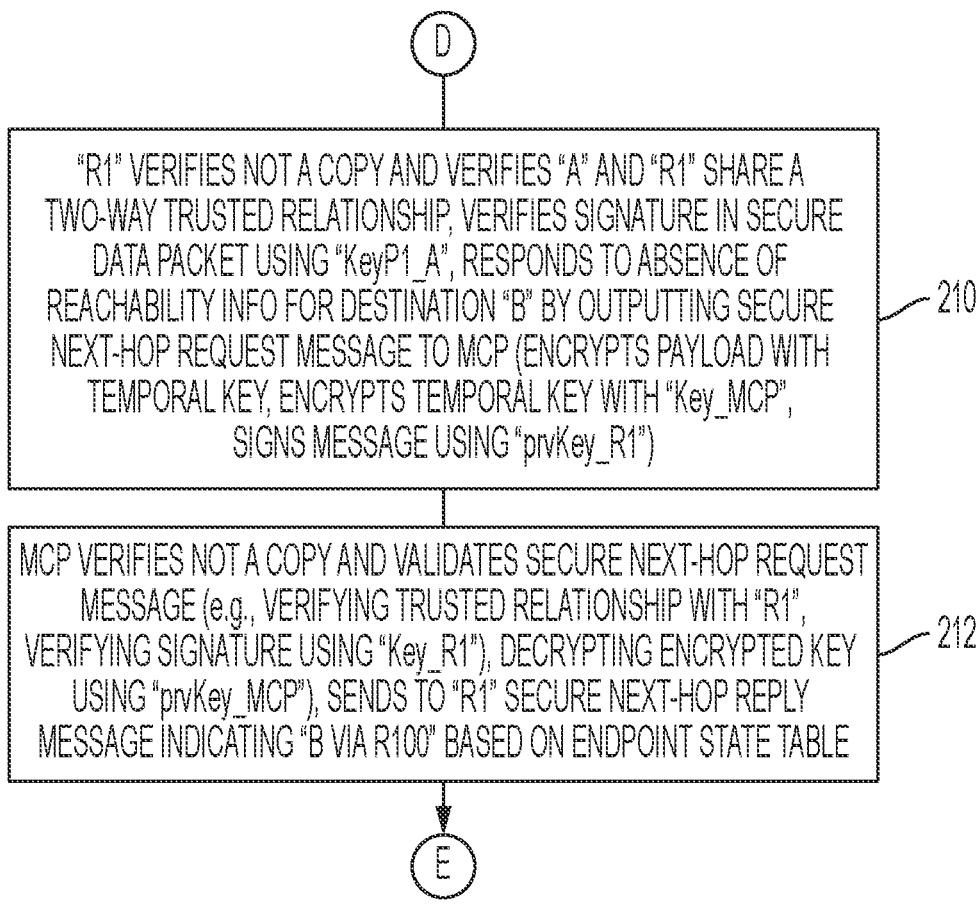

Referring to FIG. 9D, the replicator device "R1" 16 in operation 210 can determine (following anti-replay verification as described above) the source address field ("SRC=A") of the secure data packet 158a is from a first party-trusted peer based on determining the endpoint device "A" 12 and the replicator device "R1" 16 share a trusted relationship as described above, including an established association between the key pair comprising "KeyP1_A" and "prvKey_R1"; hence, the replicator device "R1" 16 can respond to determining it has a first party trust relationship with the endpoint device "A" 12 by utilizing its stored copy of the public key "KeyP1_A" associated with its trusted peer endpoint device "A" 12 to verify from the source endpoint signature 206 in operation 210 that the secure data packet is from the endpoint device "A" 12 and that the secure data packet has not been tampered with and is not a DoS attack.

Hence, the replicator device "R1" 16 in operation 210 determines that it can trust the received secure data packet 158a based on: (1) verifying the secure data packet 158a is not a replay attack; (2) confirming the first party-trusted relationship with the endpoint device "A" 12 identified in the source address field; and (3) verifying the source endpoint signature 206 in the secure data packet 158a using its available copy of the public key "KeyP1_A". The replicator device "R1" 16, in response to determining it can trust the received secure data packet (even though the encrypted payload is unreadable by the replicator device "R1" 16), determines how to forward the secure data packet to the destination endpoint device "B" 12.

The memory circuit 94 of the physical network device 88 executing the replicator device "R1" 16 is configured for storing a forwarding information base (FIB) 156 identifying trusted peer devices that are connected to the replicator device "R1" 16 (e.g., the endpoint device "A" 12, and each of the other replicator devices 16); in other words, the replicator device "R1" 16 comprises the FIB 156. The replicator device "R1" 16 also comprises a flow table 154 for forwarding data traffic to identified destinations. The replicator device "R1" 16 can determine in operation 210 there is an entry in its FIB specifying the endpoint device "A" 12 is attached to an identifiable network socket connection (e.g., "Socket A") for transmitting secure data packets, for example 158b or 158c, via an identifiable device interface circuit 90. Since the endpoint device "B" 12 is not directly connected to the replicator device "R1" 16, the replicator device "R1" 16 also can determine that the destination endpoint device "B" 12 specified in the secure data packet is not in its FIB; hence, the replicator device "R1" 16 can respond to a determined absence of the destination endpoint device "B" 12 in its FIB by determining if there is a flow table entry 154 specifying a path for reaching the destination endpoint device "B" 12.

In response to a determined absence of the destination endpoint device "B" 12 in any flow table entry 154, the replicator device "R1" 16 in operation 210 can "punt" and send a secure next-hop request message to the MCP device 14 requesting a next hop replicator 16 for reaching the destination endpoint device "B" 12. As described previously, the replicator device "R1" 16 can encrypt the payload of the next-hop request message with its own dynamically-generated temporal key 168, encrypt the temporal key with the public key "Key_MCP" and attach the encrypted temporal key 178 to the next-hop request message (containing the encrypted payload 204 for the next-hop request message); the replicator device "R1" 16 also can digitally sign the message using its private key "prvKey_R1" 172a for generation of a corresponding replicator signature "SIGN (prvKey_R1) [SECURE_PACKET]" 170.

The MCP device 14 can respond in operation 212 by validating the secure next-hop request message based on verifying no replay attack as described above with respect to FIG. 10, verifying a two-way trusted relationship with the replicator device "R1" 16, verifying the replicator signature 170, and decryption of the payload of the next-hop request message. The MCP device 14 can respond to successful validation by determining from its connection status entries 160 whether the destination endpoint device "B" 12 is reachable: if the destination endpoint device "B" 12 is not reachable due to having an offline state, the MCP device 14 can "poison" the flow by responding to the replicator device "R1" 16 with a secure next-hop reply message indicating a "null" next hop, indicating to the replicator device "R1" 16 that the destination endpoint device "B" 12 is unreachable.

In response to the MCP device 14 determining from the endpoint state table of the endpoint device "B" 12 that the destination endpoint device "B" 12 is reachable via the replicator device "R100" 16, the MCP device 14 in operation 212 can generate and send to the replicator device "R1" 16 a secure next-hop reply message (secured, e.g., as described above) indicating the destination endpoint device "B" 12 is reachable via the next-hop replicator device "R100" 16.

Figure 9E:
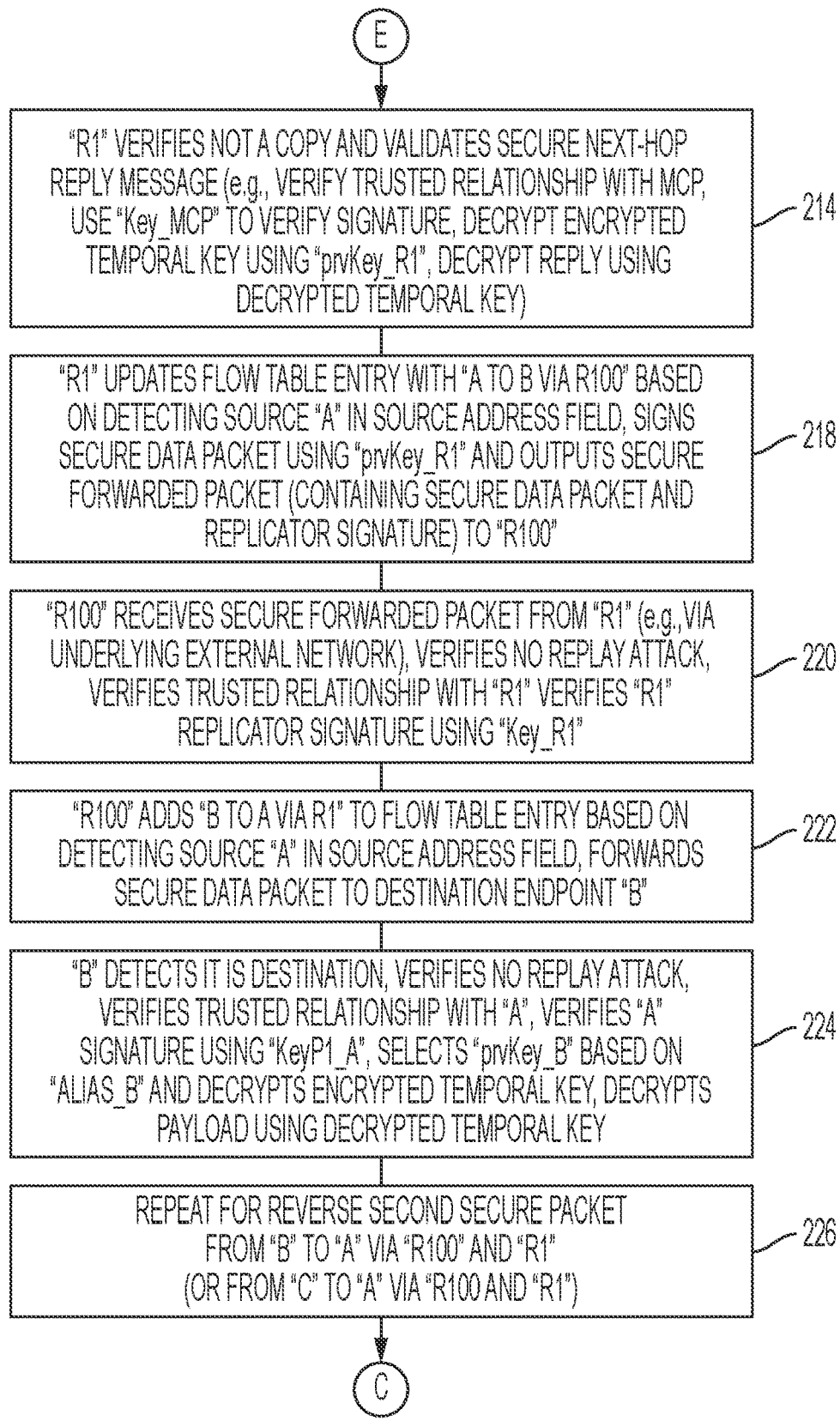

Referring to FIG. 9E, the replicator device "R1" 16 in operation 214 can respond to the secure next-hop reply message (following anti-replay verification and validation as described above) by detecting the destination endpoint device "B" 12 is reachable via the replicator device "R100" 16, and determining from its FIB entry 156 that the replicator device "R1" 16 has a path for reaching the replicator device "R100" 16 via a network socket connection (e.g., "Socket R100") that is within the pairwise topology 98 between the replicator devices 16. The replicator device "R1" 16 in operation 218 can add to its flow table a flow table entry 154 specifying that secure data packets (e.g., 158a) sent from the source endpoint device "A" 12 to the destination endpoint device "B" 12 are forwarded via the next-hop replicator device "R100" 16.

Although the replicator device "R1" 16 can determine that it can reach the destination endpoint device "B" 12 via the next-hop replicator device "R100" 16, in actual implementation as described above the existing secure private core network 10 can be implemented as a hybrid network overlying a multi-hop transport layer (60 of FIG. 3), such as the Internet. Hence, the logical one-hop connection 216 between the replicator device "R1" 16 and the replicator device "R100" 16 can span one or more external physical data networks 96. The example embodiments ensure, the logical one-hop connection 216 between the replicator device "R1" 16 and the replicator device "R100" 16 is secured against potential attacks within the external data network 96, for example by a malicious device 162 attempting packet snooping, packet injection, etc.

According to example embodiments, the replicator device "R1" 16 in operation 218 can secure its logical one-hop connection 216 with its peer replicator device "R100" 16 (overlying one or more physical data networks) based on the first party-trusted relationship that was established between the replicator device "R1" 16 and the replicator device "R100" 16 as a cohort according to the prescribed secure salutation protocol described above. The replicator device "R1" 16 can generate and send in operation 218 a secure forwarded packet, comprising the secure data packet 158a, for secure transmission and delivery to its trusted peer replicator device "R100" 16.

In particular, the replicator device "R1" 16 in operation 218 can generate a replicator signature 170 based on signing the secure data packet 158a with its private key "prvKey_R1" 172a, and adding the replicator signature 170 to the secure data packet 158a, resulting in the secure forwarded packet 164a comprising the secure data packet 158a and the replicator signature 170. The replicator device "R1" 16 can forward the secure forwarded packet 164a to its trusted peer replicator device "R100" 16 via the network socket connection "Socket R100" specified in the FIB 156. As apparent from the foregoing, the secure forwarded packet can be forwarded to the replicator device "R100" 16 via one or more data networks underlying the secure data network 5, including for example the external data network 96.

The replicator device "R100" 16 in operation 220 can respond to receiving the secure forwarded packet 164a by detecting from the destination address ("DEST=B") that it ("R100" 16) is not the intended destination. In response to the replicator device "R100" 16 determining it is not the intended destination of the secure forwarded packet 164a, the replicator device "R100" 16 can determine whether the secure forwarded packet 164a is a replay attack based on determining whether a prescribed hash of the encrypted temporal key was previously detected (i.e., a match detected between a prior hash and the current hash of the encrypted temporal key indicates a replay attack).

In response to the replicator device "R100" 16 verifying there is no replay attack, the replicator device "R100" 16 in operation 220 can validate the secure forwarded packet 164a based on validating the replicator signature 170, based on the replicator device "R100" 16 having possession of the corresponding public key "Key_R1" based on the trust relationship established between the replicator device "R1" 16 and the replicator device "R100" 16. Hence, the validating of the replicator signature 170 validates that the secure forwarded 164a packet was validated by its trusted peer replicator device "R1" 16, and the validating of the replicator signature by the replicator device "R100" 16 further validates that the secure forwarded packet has not been corrupted and is not a DoS attack.

Hence, the validation of the replicator signature by the replicator device "R100" 16 enables the replicator device "R100" 16 in operation 220 to trust the secure forwarded packet, even though the replicator device "R100" 16 is unable to decrypt the secure data packet because it does not own the private key "prvKey_B" needed to decrypt the encrypted temporal key 178 that is further needed to decrypt the encrypted payload 204. Hence, the secure forwarded packet 164a enables trusted validation by the replicator device "R100" 16 based on its two-way trusted relationship with the replicator device "R1" 16, without any risk of decrypting the contents of the secure data packet 158a.

In response to validating the secure forwarded packet 164a, the replicator device "R100" 16 can determine that it has a trusted relationship with the destination endpoint device "B" 12 based on detecting its FIB entry 156 for reaching the endpoint device "B" 12 via a network socket connection "Socket_B". The replicator device "R100" 16 in operation 222 also can add a flow table entry 154 specifying any data flow from the endpoint device "B" 12 to the endpoint device "A" 12 is forwarded by the replicator device "R100" 16 to its trusted peer replicator device "R1" 16. The replicator device "R100" 16 also can remove the replicator signature 170 and forward the secure data packet 158a to the destination endpoint device "B" 12 via the network socket connection "Socket_B" that provides the logical one-hop connection between the replicator device "R100" 16 and the endpoint device "B" 12.

If the replicator device "R100" 16 determines that the endpoint device "B" 12 was unreachable, the replicator device "R100" 16 can remove the associated flow (from "B" to "A" via "R1") from its flow table 154, and generate and send a secure poison flow message to the peer replicator device "R1" 16: the secure poison flow message (secured as described above) can cause the peer replicator device "R1" 16 (following anti-replay verification and validation as described above) to remove the associated flow (from "A" to "B" via "R100") from its flow table 154 and send a corresponding secure poison flow message to the source endpoint device "A" 12 indicating that the destination endpoint device "B" 12 is unreachable. The replicator device "R100" 16 in also can send a secure poison flow message to the MCP device 14, causing the MCP device 14 in operation 234 (following anti-replay verification and validation as described above) to update its connection status entry 160 to specify that the endpoint device "B" 12 is "offline" and unreachable in the secure data network 5.

Referring to FIG. 9E, the destination endpoint device "B" 12 in operation 224 can respond to receiving the secure data packet 158 from the replicator device "R100" 16 by validating the secure data packet 158a: the destination endpoint device "B" 12 can determine from the destination address field that it is the destination device.

Hence, the destination endpoint device "B" 12 in operation 224 can verify the secure data packet 158a is not a replay attack (as described above), that the secure data packet 158a was properly signed by the source device endpoint device "A" 12 (based on validating the source endpoint signature using its local copy of the public key "KeyP1_A"), and that the secure data packet is from a trusted device replicator device "R100" 16. The destination endpoint device "B" 12 also can determine that the secure data packet specifies an alias ("ALIAS_B") 174 that is recognized by the destination device endpoint device "B" 12, hence the destination device endpoint device "B" 12 can retrieve the private key associated with the alias (e.g., "prvKey_B" associated with "ALIAS_B") to decrypt the encrypted temporal key 178, and recover the temporal key 168. The destination endpoint device "B" 12 can apply the decrypted temporal key 168 to decrypt the encrypted payload 204 to recovery the decrypted payload 166 for processing.

As apparent from the foregoing, it is impossible for the replicator device "R1" 16 or the replicator device "R100" 16 to decrypt the secure data packet 158a generated by the source endpoint device "A" 12, as neither the replicator device "R1" 16 nor the replicator device "R100" 16 possess the private key "prvKey_B" that is needed to decrypt the payload of the secure data packet; however, the secure data packet 158a can be securely transported via the secure private core network 10 (and overlying any one or more private and/or public data network) based on the chain of trust established between each pair of network devices "A to R1", "R1 to R100" and "R100 to B" along the path from the source endpoint device "A" 12 to the destination endpoint device "B" 12. Hence, the secure data packet 158a is never forwarded in the secure private core network 10 unless the secure data packet 158 is verified as legitimate (based on a signature) and trusted (based on receipt from a trusted transmitting device).

Moreover, the flow tables 154 in the replicator devices R1 and R100 enable backward flows between the endpoint devices "A" and "B" 12 that comply with firewall policies, while the replicator devices 16 can attach replicator signatures 170 to ensure validation as a secure data packet 158 traverses the secure private core network 10.

Hence, the crypto-switching as described herein can provide fast throughput by the network devices, as there is no decrypting along the way, rather each intermediate network device can validate a secure data packet merely by checking a hash to confirm no replay attack, doing a table lookup to determine a next-hop, and adding a signature if needed for a next-hop replicator.

As illustrated in operation 226, the above-operations can be repeated for a second secure data packet (e.g., 158b or 158c) from an endpoint device (e.g., "B" or "C") 12 connected to the replicator device "R100" 16 and destined for the endpoint device "A" 12. Hence, the replicator device "R100" 16 in operation 200 validate the received secure data packet 158b and/or 158c, and determine from its flow table 154 that it has a path for reaching the destination endpoint device "A" 12 via the replicator device "R1" 16; the replicator device "R100" 16 also can add the flow table entry of "C to A via R1". The replicator device "R100" 16 in operation 218 can generate and output to the replicator device "R1" 16 a secure forwarded packet 164b containing the secure data packet 158b and a corresponding replicator signature 170 generated based on signing the secure data packet 158b using the private key "prvKey_R100" 172; the replicator device "R100" 16 in operation 200 also can generate and output to the replicator device "R1" 16 a secure forwarded packet 164c containing the secure data packet 158c and a corresponding replicator signature 170 generated based on signing the secure data packet 158c using the private key "prvKey_R100" 172.

The replicator device "R1" 16 in operation 220 can receive the secure forwarded packet 164b (containing the secure data packet 158b and the corresponding replicator signature 170) and/or the secure forwarded packet 164c (containing the secure data packet 158c and the corresponding replicator signature 170), and in response verify the corresponding two-way trusted relationship with the replicator device "R100" 16 having sent the secure forwarded packet 164b and/or 164c. The replicator device "R1" 16 in operation 220 also can validate the replicator signatures 170 based on the public key "Key_R100", and in response forward the secure data packet 158b (and/or 158c) in operation 224 to the destination endpoint device "A" 12.

As described previously, if either the endpoint device "A" 12 or the endpoint device "B" 12 go offline from the secure private core network 10, the associated replicator (e.g., the replicator device "R1" 16) can detect a corresponding disconnect condition, remove the offline endpoint device (e.g., "A") from its FIB entry 156, and determine from the associated flow table 154 that the trusted peer replicator device (e.g., "R100") associated with the flow between "A" and "B" should be sent a secure poison flow message to poison the flow between "A" and "B". The replicator device "R100" 16 can respond to the poison flow message (following anti-replay verification and validation as described above) by removing the flow table entry "B to A via R1", and sending a poison flow message to the endpoint device "B" 12 specifying that the endpoint device "A" 12 is no longer reachable. The endpoint device "B" 12 can respond to the poison flow message (following anti-replay verification and validation as described above) by updating its own list specifying that the endpoint device "A" 12 is no longer available, ensuring the endpoint device "B" 12 does not waste wireless bandwidth by attempting to transmit data packets to a destination that is no longer reachable.

Similar poison flow messages can be used to mitigate against a lost replicator device "R1" or "R100" 16: each replicator device 16 connected to the lost replicator device in the pairwise topology (e.g., the "mesh") 98 can detect that the connection has been broken. In response to a broken socket connection R1_100, each replicator device 16 can utilize its flow table 154 to determine if any endpoint devices 12 have any flows associated with the lost replicator device, in which case the corresponding replicator device 16 can send a poison flow message to each identified endpoint device 12 to indicate that its connection to the lost replicator device had been broken.

The replicator device "R1" 16 also can send a secure poison flow message to the MCP device 14, causing the MCP device 14 (following anti-replay verification and validation as described above) to update its connection status entry 160 to specify that the endpoint device "A" 12 is offline. Once the endpoint device "A" 12 reattaches to the secure private core network 10, the autonomic synchronizer 52 executed in the MCP device 14 can update the connection status entry 160 for the endpoint device "A" 12 with its updated allocated replicator device 16, and any trusted peers of the endpoint device "B" 12 (identifiable by the list of cohorts maintained by the endpoint device "B" 12) can autonomically update the connection status of the endpoint device "B" 12, thereby enabling autonomic synchronization of any data objects between the endpoint device "B" 12 and its trusted peers.

According to example embodiments, anti-replay protection can be implemented in a scalable and secure manner based on executing a prescribed hash of an encrypted bitstring corresponding to an encrypted temporal key in a received secure data packet, and determining whether the received secure data packet is a copy (based on the prescribed hash matching a prior instance of the prescribed hash), or whether the received secure data packet is not a copy (based on a determined absence of a prior instance of the prescribed hash). The generation of the encrypted bitstring as an encrypted temporal key ensures that no network device (except the trusted destination device having possession of the private key) can predict the random number generation algorithm used to generate the temporal key, ensuring security in the temporal key. Use of the encrypted temporal key also enables generation of a cryptographically-unique "nonce" that is unique, never repeated, and that can be readily verified using an undetectable private prescribed hash. Hence, a network device can execute anti-replay verification with minimal resource expenditure prior to consuming additional resources to process the received secure data packet.

Although the example embodiments illustrate the pairwise topology of two-way trusted replicator devices as a mesh of trusted replicator devices, other topologies (e.g., star, tree, hybrid, etc.) can be used to deploy the pairwise topology of two-way trusted replicator devices.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
generating and maintaining, by a network device in a secure peer-to-peer data network, a secure private key and a corresponding secure public key;
establishing, by the network device, a two-way trusted relationship with a second network device in the secure peer-to-peer data network, the two-way trusted relationship between the network device and the second network device establishing the network device and the second network device as trusted peer devices in the secure peer-to-peer data network;
generating by the network device a time-based temporal key that is never repeated, and encrypting by the network device a data packet payload using the temporal key into an encrypted payload;
encrypting, by the network device, the temporal key into an encrypted temporal key using a second secure public key generated by the second network device; and
generating and outputting, by the network device, a secure data packet destined for the second network device and comprising the encrypted temporal key and the encrypted payload, causing a receiving network device in the secure peer-to-peer data network to verify the secure data packet is not a copy based on a determined absence of a prior prescribed hash of at least a portion of the encrypted temporal key.

2. The method of claim 1, wherein the generating and maintaining comprises generating a signature based on securely signing the encrypted temporal key and the encrypted payload with the secure private key, and adding the signature to the secure data packet.

3. The method of claim 1, wherein the generating and maintaining comprises adding to the secure data packet an alias that identifies, for the second network device, a keypair association between the secure public key of the network device and a second secure private key associated with the second secure public key of the second network device, the alias enabling the second network device to identify the second secure private key for decrypting the encrypted temporal key.

4. The method of claim 1, further comprising generating a corresponding unique temporal key for encrypting each data packet payload prior to transmission in a corresponding secure data packet.

5. One or more non-transitory tangible media encoded with logic for execution by a machine and when executed by the machine operable for:
generating and maintaining, by the machine implemented as a network device in a secure peer-to-peer data network, a secure private key and a corresponding secure public key;
establishing a two-way trusted relationship with a second network device in the secure peer-to-peer data network, the two-way trusted relationship between the network device and the second network device establishing the network device and the second network device as trusted peer devices in the secure peer-to-peer data network;
generating a time-based temporal key that is never repeated, and encrypting a data packet payload using the temporal key into an encrypted payload;
encrypting the temporal key into an encrypted temporal key using a second secure public key generated by the second network device; and
generating and outputting a secure data packet destined for the second network device and comprising the encrypted temporal key and the encrypted payload, causing a receiving network device in the secure peer-to-peer data network to verify the secure data packet is not a copy based on a determined absence of a prior prescribed hash of at least a portion of the encrypted temporal key.

6. The one or more non-transitory tangible media of claim 5, wherein the generating and maintaining comprises generating a signature based on securely signing the encrypted temporal key and the encrypted payload with the secure private key, and adding the signature to the secure data packet.

7. The one or more non-transitory tangible media of claim 5, wherein the generating and maintaining comprises adding to the secure data packet an alias that identifies, for the second network device, a keypair association between the secure public key of the network device and a second secure private key associated with the second secure public key of the second network device, the alias enabling the second network device to identify the second secure private key for decrypting the encrypted temporal key.

8. The one or more non-transitory tangible media of claim 5, further operable for generating a corresponding unique temporal key for encrypting each data packet payload prior to transmission in a corresponding secure data packet.

9. An apparatus implemented as a physical machine, the apparatus comprising:
non-transitory machine readable media configured for storing executable machine readable code;
a device interface circuit; and
a processor circuit configured for executing the machine readable code, and when executing the machine readable code operable for:
generating and maintaining, by the apparatus implemented as a network device in a secure peer-to-peer data network, a secure private key and a corresponding secure public key,
establishing a two-way trusted relationship with a second network device in the secure peer-to-peer data network, the two-way trusted relationship between the network device and the second network device establishing the network device and the second network device as trusted peer devices in the secure peer-to-peer data network,
generating a time-based temporal key that is never repeated, and encrypting a data packet payload using the temporal key into an encrypted payload,
encrypting the temporal key into an encrypted temporal key using a second secure public key generated by the second network device, and
generating and outputting a secure data packet destined for the second network device and comprising the encrypted temporal key and the encrypted payload, causing a receiving network device in the secure peer-to-peer data network to verify the secure data packet is not a copy based on a determined absence of a prior prescribed hash of at least a portion of the encrypted temporal key.

10. A method comprising:
generating and maintaining, by a network device in a secure peer-to-peer data network, a secure private key and a corresponding secure public key;

establishing, by the network device, a two-way trusted relationship with a second network device in the secure peer-to-peer data network, the two-way trusted relationship between the network device and the second network device establishing the network device and the second network device as trusted peer devices in the secure peer-to-peer data network;

generating by the network device a time-based temporal key that is never repeated, and encrypting by the network device a data packet payload using the temporal key into an encrypted payload;

encrypting, by the network device, the temporal key into an encrypted temporal key using a second secure public key generated by the second network device;

generating and outputting, by the network device, a secure data packet destined for the second network device and comprising the encrypted temporal key and the encrypted payload, causing a receiving network device in the secure peer-to-peer data network to verify the secure data packet is not a copy based on a determined absence of a prior prescribed hash of at least a portion of the encrypted temporal key;

receiving, by the network device from the second network device in the secure peer-to-peer data network, a second secure data packet comprising a source address, a destination address, a first encrypted bitstring corresponding to a second encrypted temporal key, and a second encrypted bitstring corresponding to a second encrypted payload in the second secure data packet; and validating, by the network device, the second secure data packet based on executing a prescribed hash of at least a portion of the first encrypted bitstring, and determining the second secure data packet is not a copy based on a determined absence of a prior instance of the prescribed hash.

11. The method of claim 10, wherein the validating further comprises storing the prescribed hash of at least the portion of the first encrypted bitstring in a data structure associated with an identified flow between the source address and the destination address.

12. The method of claim 10, further comprising discarding a third secure data packet based on:
executing the prescribed hash on at least a corresponding portion of the first encrypted bitstring in the third secure data packet; and
determining the prescribed hash from the third secure data packet matches the prescribed hash from the second secure data packet.

13. The method of claim 10, further comprising:
detecting, in response to determining the second secure data packet is not a copy, that the destination address identifies the network device, and in response validating a signature in the second secure data packet as generated by a second network device associated with the source address;
first decrypting the first encrypted bitstring using the secure private key of the network device for recovery of a decrypted temporal key; and
second decrypting the second encrypted bitstring using the decrypted temporal key for recovery of a decrypted payload.

14. The method of claim 13, wherein:
the first decrypting includes selecting the secure private key based on an alias in the second secure data packet, the alias identifying a keypair association between the secure private key and a secure public key of the second network device;
the secure public key of the second network device used, by the network device, for validating the signature in the second secure data packet.

15. One or more non-transitory tangible media encoded with logic for execution by a machine and when executed by the machine operable for:
generating and maintaining, by the machine implemented as a network device in a secure peer-to-peer data network, a secure private key and a corresponding secure public key;
establishing a two-way trusted relationship with a second network device in the secure peer-to-peer data network, the two-way trusted relationship between the network device and the second network device establishing the network device and the second network device as trusted peer devices in the secure peer-to-peer data network;
generating a time-based temporal key that is never repeated, and encrypting a data packet payload using the temporal key into an encrypted payload;
encrypting the temporal key into an encrypted temporal key using a second secure public key generated by the second network device;
generating and outputting a secure data packet destined for the second network device and comprising the encrypted temporal key and the encrypted payload, causing a receiving network device in the secure peer-to-peer data network to verify the secure data packet is not a copy based on a determined absence of a prior prescribed hash of at least a portion of the encrypted temporal key;
receiving, by the network device in the secure peer-to-peer data network, a second secure data packet from the second network device and comprising a source address, a destination address, a first encrypted bitstring corresponding to a second encrypted temporal key, and a second encrypted bitstring corresponding to a second encrypted payload in the second secure data packet; and
validating the second secure data packet based on executing a prescribed hash of at least a portion of the first encrypted bitstring, and determining the second secure data packet is not a copy based on a determined absence of a prior instance of the prescribed hash.

16. The one or more non-transitory tangible media of claim 15, further operable for discarding a third secure data packet based on:
executing the prescribed hash on at least a corresponding portion of the first encrypted bitstring in the third secure data packet; and
determining the prescribed hash from the third secure data packet matches the prescribed hash from the second secure data packet.

17. The one or more non-transitory tangible media of claim 15, further operable for:
detecting, in response to determining the second secure data packet is not a copy, that the destination address identifies the network device, and in response validating a signature in the second secure data packet as generated by a second network device associated with the source address;
first decrypting the first encrypted bitstring using the secure private key of the network device for recovery of a decrypted temporal key; and second decrypting the second encrypted bitstring using the decrypted temporal key for recovery of a decrypted payload.

18. An apparatus implemented as a physical machine, the apparatus comprising:

non-transitory machine readable media configured for storing executable machine readable code;

a device interface circuit; and a processor circuit configured for executing the machine readable code, and when executing the machine readable code operable for:

generating and maintaining, by the apparatus implemented as a network device in a secure peer-to-peer data network, a secure private key and a corresponding secure public key, establishing a two-way trusted relationship with a second network device in the secure peer-to-peer data network, the two-way trusted relationship between the network device and the second network device establishing the network device and the second network device as trusted peer devices in the secure peer-to-peer data network, generating a time-based temporal key that is never repeated, and encrypting a data packet payload using the temporal key into an encrypted payload, encrypting the temporal key into an encrypted temporal key using a second secure public key generated by the second network device, generating and outputting a secure data packet destined for the second network device and comprising the encrypted temporal key and the encrypted payload, causing a receiving network device in the secure peer-to-peer data network to verify the secure data packet is not a copy based on a determined absence of a prior prescribed hash of at least a portion of the encrypted temporal key, receiving, by the network device in the secure peer-to-peer data network, a second secure data packet from the second network device and comprising a source address, a destination address, a first encrypted bitstring corresponding to a second encrypted temporal key, and a second encrypted bitstring corresponding to a second encrypted payload in the second secure data packet, and validating the second secure data packet based on executing a prescribed hash of at least a portion of the first encrypted bitstring, and determining the secure data packet is not a copy based on a determined absence of a prior instance of the prescribed hash.

19. The method of claim 1, wherein the secure-peer-to-peer data network is cloudless.

20. The method of claim 10, wherein the secure-peer-to-peer data network is cloudless.

* * * * *